(12) United States Patent
Newton et al.

(10) Patent No.: US 10,924,573 B2
(45) Date of Patent: *Feb. 16, 2021

(54) HANDLING LONG-TAIL CONTENT IN A CONTENT DELIVERY NETWORK (CDN)

(71) Applicant: Level 3 Communications, LLC, Broomfield, CO (US)

(72) Inventors: Christopher Newton, Thousand Oaks, CA (US); Laurence Lipstone, Calabasas, CA (US); David Fullagar, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,791

(22) Filed: Feb. 25, 2019

(65) Prior Publication Data

US 2019/0320034 A1   Oct. 17, 2019

Related U.S. Application Data

(63) Continuation of application No. 15/645,584, filed on Jul. 10, 2017, now Pat. No. 10,218,806, which is a
(Continued)

(51) Int. Cl.
*H04L 29/08* (2006.01)
*H04N 21/258* (2011.01)
(Continued)

(52) U.S. Cl.
CPC ...... *H04L 67/2814* (2013.01); *H04L 67/1014* (2013.01); *H04L 67/1097* (2013.01);
(Continued)

(58) Field of Classification Search
CPC ............. H04L 67/2814; H04L 67/1014; H04L 67/1097; H04L 67/2842; H04N 21/25891;
(Continued)

(56) References Cited

U.S. PATENT DOCUMENTS 4,495,570 A   1/1985  Kitajima et al.
4,591,983 A   5/1986  Bennett et al.
(Continued)

FOREIGN PATENT DOCUMENTS

AU   763380    6/2003
CA   2202572   10/1998
(Continued)

OTHER PUBLICATIONS

Summons to attend oral proceedings, dated May 8, 2019, Application No. 09727342.9, filed Mar. 21, 2019; 6 pgs.
(Continued)

*Primary Examiner* — Patrice L Winder

(57) ABSTRACT

A content delivery network has at least a first tier of servers. A content delivery method includes, at a first server in the first tier of servers, obtaining a request from a client for a resource. If the resource is available at the first server or at a peer of the first server, then the resource is served to the client from the first server. Otherwise, it is determined whether the resource is popular, and if the resource is determined to be popular, then the first server obtains the resource and the first server serves the resource to the client. If the resource is determined not to be popular, the client is directed to a second server, not in the first tier of servers, and the second server serves the resource to the client. The second server may be in a second tier of servers or it may be an origin server.

20 Claims, 7 Drawing Sheets

Related U.S. Application Data continuation of application No. 12/880,324, filed on Sep. 13, 2010, now Pat. No. 9,762,692, which is a continuation-in-part of application No. 12/408,681, filed on Mar. 21, 2009, now Pat. No. 8,930,538.

(60) Provisional application No. 61/042,412, filed on Apr. 4, 2008.

(51) Int. Cl.
    *H04N 7/173* (2011.01)
    *H04N 21/231* (2011.01)
    *H04N 21/222* (2011.01)
    *H04N 21/472* (2011.01)

(52) U.S. Cl.
CPC ..... *H04L 67/2842* (2013.01); *H04N 7/17354* (2013.01); *H04N 21/222* (2013.01); *H04N 21/23103* (2013.01); *H04N 21/23106* (2013.01); *H04N 21/25891* (2013.01); *H04N 21/472* (2013.01)

(58) Field of Classification Search
CPC ......... H04N 7/17354; H04N 21/23106; H04N 21/23103; H04N 21/222; H04N 21/472
See application file for complete search history.

(56) References Cited

U.S. PATENT DOCUMENTS

| | | |
|---|---|---|
| 4,594,704 A | 6/1986 | Ollivier |
| 4,726,017 A | 2/1988 | Krum et al. |
| 4,803,641 A | 2/1989 | Hardy et al. |
| 4,839,798 A | 6/1989 | Eguchi et al. |
| 4,847,784 A | 7/1989 | Clancey |
| 4,920,432 A | 4/1990 | Eggers et al. |
| 4,922,417 A | 5/1990 | Churm et al. |
| 4,943,932 A | 7/1990 | Lark et al. |
| 4,949,187 A | 8/1990 | Cohen |
| 4,949,248 A | 8/1990 | Caro |
| 5,029,232 A | 7/1991 | Nall |
| 5,130,792 A | 7/1992 | Tindell et al. |
| 5,132,992 A | 7/1992 | Yurt et al. |
| 5,136,716 A | 8/1992 | Harvey et al. |
| 5,172,413 A | 12/1992 | Bradley et al. |
| 5,191,573 A | 3/1993 | Hair |
| 5,253,275 A | 10/1993 | Yurt et al. |
| 5,253,341 A | 10/1993 | Rozmanith et al. |
| 5,287,499 A | 2/1994 | Nemes |
| 5,287,537 A | 2/1994 | Newmark et al. |
| 5,291,554 A | 3/1994 | Morales |
| 5,341,477 A | 8/1994 | Pitkin et al. |
| 5,371,532 A | 12/1994 | Gelman et al. |
| 5,410,343 A | 4/1995 | Coddington et al. |
| 5,414,455 A | 5/1995 | Hooper et al. |
| 5,442,389 A | 8/1995 | Blahut et al. |
| 5,442,390 A | 8/1995 | Hooper et al. |
| 5,442,749 A | 8/1995 | Northcutt et al. |
| 5,471,622 A | 11/1995 | Eadline |
| 5,475,615 A | 12/1995 | Lin |
| 5,508,732 A | 4/1996 | Bottomley et al. |
| 5,515,511 A | 5/1996 | Nguyen et al. |
| 5,519,435 A | 5/1996 | Anderson |
| 5,528,281 A | 6/1996 | Grady et al. |
| 5,539,621 A | 7/1996 | Kikinis |
| 5,542,087 A | 7/1996 | Neimat et al. |
| 5,544,313 A | 8/1996 | Shachnai et al. |
| 5,544,327 A | 8/1996 | Dan et al. |
| 5,550,577 A | 8/1996 | Verbiest et al. |
| 5,550,863 A | 8/1996 | Yurt et al. |
| 5,550,982 A | 8/1996 | Long et al. |
| 5,557,317 A | 9/1996 | Nishio et al. |
| 5,568,181 A | 10/1996 | Greenwood et al. |
| 5,572,643 A | 11/1996 | Judson |
| 5,590,288 A | 12/1996 | Castor et al. |
| 5,592,611 A | 1/1997 | Midgely et al. |
| 5,594,910 A | 1/1997 | Filepp et al. |
| 5,603,026 A | 2/1997 | Demers et al. |
| 5,614,940 A | 3/1997 | Cobbley et al. |
| 5,619,648 A | 4/1997 | Canale et al. |
| 5,623,656 A | 4/1997 | Lyons |
| 5,625,781 A | 4/1997 | Cline et al. |
| 5,627,829 A | 5/1997 | Gleeson et al. |
| 5,630,067 A | 5/1997 | Kindell et al. |
| 5,633,999 A | 5/1997 | Clowes et al. |
| 5,634,006 A | 5/1997 | Baugher et al. |
| 5,638,443 A | 6/1997 | Stefik et al. |
| 5,644,714 A | 7/1997 | Kikinis |
| 5,646,676 A | 7/1997 | Dewkett et al. |
| 5,649,186 A | 7/1997 | Ferguson |
| 5,659,729 A | 8/1997 | Nielsen |
| 5,666,362 A | 9/1997 | Chen et al. |
| 5,671,279 A | 9/1997 | Elgamal |
| 5,675,734 A | 10/1997 | Hair |
| 5,682,512 A | 10/1997 | Tetrick |
| 5,699,513 A | 12/1997 | Feigen et al. |
| 5,712,979 A | 1/1998 | Graber et al. |
| 5,715,453 A | 2/1998 | Stewart |
| 5,721,914 A | 2/1998 | DeVries |
| 5,734,719 A | 3/1998 | Tsevdos et al. |
| 5,734,831 A | 3/1998 | Sanders |
| 5,740,423 A | 4/1998 | Logan et al. |
| 5,742,762 A | 4/1998 | Scholl et al. |
| 5,751,961 A | 5/1998 | Smyk |
| 5,761,507 A | 6/1998 | Govett |
| 5,761,663 A | 6/1998 | Lagarde et al. |
| 5,764,906 A | 6/1998 | Edelstein et al. |
| 5,774,660 A | 6/1998 | Brendel et al. |
| 5,774,668 A | 6/1998 | Choquier et al. |
| 5,777,988 A | 7/1998 | Cisneros |
| 5,777,989 A | 7/1998 | McGarvey |
| 5,778,187 A | 7/1998 | Monteiro et al. |
| 5,781,909 A | 7/1998 | Logan et al. |
| 5,784,058 A | 7/1998 | LaStrange et al. |
| 5,796,952 A | 8/1998 | Davis et al. |
| 5,799,141 A | 8/1998 | Galipeau et al. |
| 5,802,106 A | 9/1998 | Packer |
| 5,802,291 A | 9/1998 | Balick et al. |
| 5,812,769 A | 9/1998 | Graber et al. |
| 5,815,662 A | 9/1998 | Ong |
| 5,815,664 A | 9/1998 | Asano |
| 5,819,092 A | 10/1998 | Ferguson et al. |
| 5,828,847 A | 10/1998 | Gehr et al. |
| 5,832,069 A | 11/1998 | Waters et al. |
| 5,832,506 A | 11/1998 | Kuzma |
| 5,832,514 A | 11/1998 | Norin et al. |
| 5,835,718 A | 11/1998 | Blewett |
| 5,845,090 A | 12/1998 | Collins et al. |
| 5,845,303 A | 12/1998 | Templeman |
| 5,856,974 A | 1/1999 | Gervais et al. |
| 5,862,339 A | 1/1999 | Bonnaure et al. |
| 5,867,706 A | 2/1999 | Martin et al. |
| 5,867,799 A | 2/1999 | Lang et al. |
| 5,870,546 A | 2/1999 | Kirsch |
| 5,870,559 A | 2/1999 | Leshem et al. |
| 5,878,212 A | 3/1999 | Civanlar et al. |
| 5,884,038 A | 3/1999 | Kapoor |
| 5,890,171 A | 3/1999 | Blumer et al. |
| 5,893,116 A | 4/1999 | Simmonds et al. |
| 5,894,554 A | 4/1999 | Lowery et al. |
| 5,896,533 A | 4/1999 | Ramos et al. |
| 5,898,456 A | 4/1999 | Wahl |
| 5,903,723 A | 5/1999 | Beck et al. |
| 5,907,704 A | 5/1999 | Gudmundson et al. |
| 5,913,028 A | 6/1999 | Wang et al. |
| 5,913,033 A | 6/1999 | Grout |
| 5,918,010 A | 6/1999 | Appleman et al. |
| 5,919,247 A | 7/1999 | Van Hoff et al. |
| 5,920,701 A | 7/1999 | Miller et al. |
| 5,931,904 A | 8/1999 | Banga |
| 5,933,832 A | 8/1999 | Suzuoka et al. |
| 5,933,835 A | 8/1999 | Adams et al. |
| 5,935,207 A | 8/1999 | Logue et al. |
| 5,940,831 A | 8/1999 | Takano |

(56) References Cited

U.S. PATENT DOCUMENTS

| | | |
|---|---|---|
| 5,944,780 A | 8/1999 | Chase |
| 5,951,694 A | 9/1999 | Choquier et al. |
| 5,956,489 A | 9/1999 | San Andres et al. |
| 5,956,716 A | 9/1999 | Kenner et al. |
| 5,958,008 A | 9/1999 | Pogrebisky et al. |
| 5,961,596 A | 10/1999 | Takubo et al. |
| 5,966,440 A | 10/1999 | Hair |
| 5,968,121 A | 10/1999 | Logan et al. |
| 5,973,696 A | 10/1999 | Agranat et al. |
| 5,978,791 A | 11/1999 | Farber et al. |
| 5,983,214 A | 11/1999 | Lang et al. |
| 5,983,227 A | 11/1999 | Nazem et al. |
| 5,987,606 A | 11/1999 | Cirasole et al. |
| 5,991,809 A | 11/1999 | Kriegsman et al. |
| 5,996,025 A | 11/1999 | Day |
| 6,002,720 A | 12/1999 | Yurt et al. |
| 6,003,030 A | 12/1999 | Kenner et al. |
| 6,012,090 A | 1/2000 | Chung et al. |
| 6,014,686 A | 1/2000 | Elnozahy et al. |
| 6,014,698 A | 1/2000 | Griffiths |
| 6,016,509 A | 1/2000 | Dedrick |
| 6,016,512 A | 1/2000 | Huitema |
| 6,018,516 A | 1/2000 | Packer |
| 6,021,426 A | 2/2000 | Douglis |
| 6,023,470 A | 2/2000 | Lee et al. |
| 6,029,175 A | 2/2000 | Chow et al. |
| 6,029,176 A | 2/2000 | Cannon |
| 6,035,332 A | 3/2000 | Ingrassia et al. |
| 6,038,216 A | 3/2000 | Packer |
| 6,038,310 A | 3/2000 | Hollywood et al. |
| 6,041,324 A | 3/2000 | Earl et al. |
| 6,044,405 A | 3/2000 | Driscoll et al. |
| 6,046,980 A | 4/2000 | Packer |
| 6,049,831 A | 4/2000 | Gardell et al. |
| 6,052,718 A | 4/2000 | Gifford |
| 6,052,730 A | 4/2000 | Felciano et al. |
| 6,065,051 A | 5/2000 | Steele et al. |
| 6,065,062 A | 5/2000 | Periasamy et al. |
| 6,070,191 A | 5/2000 | Narendran et al. |
| 6,078,943 A | 6/2000 | Yu |
| 6,081,829 A | 6/2000 | Sidana |
| 6,081,835 A | 6/2000 | Antcliff |
| 6,081,840 A | 6/2000 | Zhao |
| 6,085,193 A | 7/2000 | Malkin et al. |
| 6,092,112 A | 7/2000 | Fukushige |
| 6,092,204 A | 7/2000 | Baker et al. |
| 6,094,680 A | 7/2000 | Hokanson |
| 6,094,706 A | 7/2000 | Factor et al. |
| 6,098,078 A | 8/2000 | Gehani |
| 6,098,096 A | 8/2000 | Tsirigotis et al. |
| 6,105,028 A | 8/2000 | Sullivan et al. |
| 6,108,673 A | 8/2000 | Brandt et al. |
| 6,108,703 A | 8/2000 | Leighton et al. |
| 6,112,231 A | 8/2000 | DeSimone et al. |
| 6,112,239 A | 8/2000 | Kenner et al. |
| 6,112,240 A | 8/2000 | Pogue et al. |
| 6,115,357 A | 9/2000 | Packer et al. |
| 6,115,752 A | 9/2000 | Chauhan |
| 6,119,143 A | 9/2000 | Dias et al. |
| 6,125,388 A | 9/2000 | Reisman |
| 6,125,394 A | 9/2000 | Rabinovich |
| 6,128,601 A | 10/2000 | Van Horne et al. |
| 6,128,623 A | 10/2000 | Mattis et al. |
| 6,128,660 A | 10/2000 | Grimm et al. |
| 6,130,890 A | 10/2000 | Leinwand et al. |
| 6,131,095 A | 10/2000 | Low et al. |
| 6,134,583 A | 10/2000 | Herriot |
| 6,144,375 A | 11/2000 | Jain et al. |
| 6,144,702 A | 11/2000 | Yurt et al. |
| 6,151,624 A | 11/2000 | Teare et al. |
| 6,154,744 A | 11/2000 | Kenner et al. |
| 6,154,753 A | 11/2000 | McFarland |
| 6,157,648 A | 12/2000 | Volt et al. |
| 6,161,137 A | 12/2000 | Johnson et al. |
| 6,163,779 A | 12/2000 | Mantha et al. |
| 6,173,311 B1 | 1/2001 | Hassett et al. |
| 6,173,322 B1 | 1/2001 | Hu |
| 6,178,160 B1 | 1/2001 | Bolton et al. |
| 6,181,867 B1 | 1/2001 | Kenner et al. |
| 6,185,598 B1 | 2/2001 | Farber et al. |
| 6,185,619 B1 | 2/2001 | Joffe et al. |
| 6,189,030 B1 | 2/2001 | Kirsch et al. |
| 6,189,039 B1 | 2/2001 | Harvey |
| 6,195,680 B1 | 2/2001 | Goldszmidt et al. |
| 6,205,120 B1 | 3/2001 | Packer et al. |
| 6,212,565 B1 | 4/2001 | Gupta |
| 6,226,618 B1 | 5/2001 | Downs |
| 6,226,642 B1 | 5/2001 | Beranek et al. |
| 6,230,196 B1 | 5/2001 | Guenthner et al. |
| 6,233,623 B1 | 5/2001 | Jeffords et al. |
| 6,240,462 B1 | 5/2001 | Agraharam et al. |
| 6,249,810 B1 | 6/2001 | Kiraly |
| 6,256,675 B1 | 7/2001 | Rabinovich |
| 6,263,313 B1 | 7/2001 | Milsted |
| 6,266,335 B1 | 7/2001 | Bhaskaran |
| 6,266,699 B1 | 7/2001 | Sevcik |
| 6,269,394 B1 | 7/2001 | Kenner et al. |
| 6,272,566 B1 | 8/2001 | Craft |
| 6,275,470 B1 | 8/2001 | Ricciulli |
| 6,282,569 B1 | 8/2001 | Wallis et al. |
| 6,286,045 B1 | 9/2001 | Griffith et al. |
| 6,298,041 B1 | 10/2001 | Packer |
| 6,314,565 B1 | 11/2001 | Kenner et al. |
| 6,317,787 B1 | 11/2001 | Boyd et al. |
| 6,324,580 B1 | 11/2001 | Jindal et al. |
| 6,324,582 B1 | 11/2001 | Sridhar et al. |
| 6,330,602 B1 | 12/2001 | Law et al. |
| 6,332,157 B1 | 12/2001 | Mighdoll et al. |
| 6,338,044 B1 | 1/2002 | Cook et al. |
| 6,343,298 B1 | 1/2002 | Savchenko et al. |
| 6,345,294 B1 | 2/2002 | O'Toole et al. |
| 6,347,085 B2 | 2/2002 | Kelly et al. |
| 6,351,775 B1 | 2/2002 | Yu |
| 6,351,776 B1 | 2/2002 | O'Brien et al. |
| 6,360,256 B1 | 3/2002 | Lim |
| 6,370,571 B1 | 4/2002 | Medin |
| 6,370,580 B2 | 4/2002 | Kriegsman |
| 6,389,462 B1 | 5/2002 | Cohen et al. |
| 6,398,245 B1 | 6/2002 | Gruse |
| 6,405,252 B1 | 6/2002 | Gupta et al. |
| 6,405,257 B1 | 6/2002 | Gersht et al. |
| 6,412,000 B1 | 6/2002 | Riddle et al. |
| 6,415,280 B1 | 7/2002 | Farber et al. |
| 6,415,368 B1 | 7/2002 | Glance et al. |
| 6,418,421 B1 | 7/2002 | Hurtado |
| 6,421,714 B1 | 7/2002 | Rai et al. |
| 6,421,726 B1 | 7/2002 | Kenner et al. |
| 6,427,170 B1 | 7/2002 | Sitaraman et al. |
| 6,430,618 B1 | 8/2002 | Karger et al. |
| 6,442,588 B1 | 8/2002 | Clark et al. |
| 6,453,319 B1 | 9/2002 | Mattis et al. |
| 6,456,630 B1 | 9/2002 | Packer et al. |
| 6,460,082 B1 | 10/2002 | Lumelsky |
| 6,460,085 B1 | 10/2002 | Toporek et al. |
| 6,463,454 B1 | 10/2002 | Lumelsky et al. |
| 6,463,508 B1 | 10/2002 | Wolf |
| 6,466,949 B2 | 10/2002 | Yang et al. |
| 6,470,389 B1 | 10/2002 | Chung et al. |
| 6,473,405 B2 | 10/2002 | Ricciulli |
| 6,480,893 B2 | 11/2002 | Kriegsman |
| 6,484,143 B1 | 11/2002 | Swildens et al. |
| 6,484,204 B1 | 11/2002 | Rabinovich |
| 6,487,555 B1 | 11/2002 | Bharat et al. |
| 6,490,580 B1 | 12/2002 | Dey et al. |
| 6,493,707 B1 | 12/2002 | Dey et al. |
| 6,496,856 B1 | 12/2002 | Kenner et al. |
| 6,502,125 B1 | 12/2002 | Kenner et al. |
| 6,502,205 B1 | 12/2002 | Yanai et al. |
| 6,502,215 B2 | 12/2002 | Raad et al. |
| 6,505,248 B1 | 1/2003 | Casper et al. |
| 6,529,477 B1 | 3/2003 | Toporek et al. |
| 6,553,413 B1 | 4/2003 | Leighton et al. |
| 6,553,420 B1 | 4/2003 | Karger et al. |
| 6,557,054 B2 | 4/2003 | Reisman |

(56) References Cited

U.S. PATENT DOCUMENTS

| | | |
|---|---|---|
| 6,564,251 B2 | 5/2003 | Katariya et al. |
| 6,577,595 B1 | 6/2003 | Counterman |
| 6,581,090 B1 | 6/2003 | Lindbo et al. |
| 6,584,083 B1 | 6/2003 | Toporek et al. |
| 6,587,837 B1 | 7/2003 | Spagna |
| 6,591,288 B1 | 7/2003 | Edwards et al. |
| 6,591,299 B2 | 7/2003 | Riddle et al. |
| 6,594,260 B1 | 7/2003 | Aviani, Jr. et al. |
| 6,598,121 B2 | 7/2003 | Challenger et al. |
| 6,611,862 B2 | 8/2003 | Reisman |
| 6,625,643 B1 | 9/2003 | Colby et al. |
| 6,651,141 B2 | 11/2003 | Adrangi |
| 6,654,344 B1 | 11/2003 | Toporek et al. |
| 6,654,807 B2 | 11/2003 | Farber et al. |
| 6,658,464 B2 | 12/2003 | Reisman |
| 6,665,706 B2 | 12/2003 | Kenner et al. |
| 6,678,659 B1 | 1/2004 | Van Kommer |
| 6,691,148 B1 | 2/2004 | Zinky et al. |
| 6,694,358 B1 | 2/2004 | Swildens et al. |
| 6,699,418 B2 | 3/2004 | Okada et al. |
| 6,708,137 B2 | 3/2004 | Carley |
| 6,718,328 B1 | 4/2004 | Norris |
| 6,732,237 B1 | 5/2004 | Jacobs et al. |
| 6,741,563 B2 | 5/2004 | Packer |
| 6,741,990 B2 | 5/2004 | Nair et al. |
| 6,751,673 B2 | 6/2004 | Shaw |
| 6,754,699 B2 | 6/2004 | Swildens et al. |
| 6,754,706 B1 | 6/2004 | Swildens et al. |
| 6,763,377 B1 | 7/2004 | Belknap |
| 6,763,388 B1 | 7/2004 | Tsimelzon |
| 6,778,502 B2 | 8/2004 | Ricciulli |
| 6,785,704 B1 | 8/2004 | McCanne |
| 6,799,221 B1 | 9/2004 | Kenner et al. |
| 6,801,576 B1 | 10/2004 | Haldeman et al. |
| 6,834,306 B1 | 12/2004 | Tsimelzon |
| 6,839,758 B2 | 1/2005 | Sorensen |
| 6,842,604 B1 | 1/2005 | Cook et al. |
| 6,859,791 B1 | 2/2005 | Spagna |
| 6,859,840 B2 | 2/2005 | Singal et al. |
| 6,870,851 B1 | 3/2005 | Leinwand et al. |
| 6,874,032 B2 | 3/2005 | Gersht et al. |
| 6,901,604 B1 | 5/2005 | Kiraly |
| 6,915,307 B1 | 7/2005 | Mattis et al. |
| 6,915,329 B2 | 7/2005 | Kriegsman |
| 6,928,442 B2 | 8/2005 | Farber et al. |
| 6,934,255 B1 | 8/2005 | Toporek et al. |
| 6,950,623 B2 | 9/2005 | Brown et al. |
| 6,963,910 B1 | 11/2005 | Belknap et al. |
| 6,963,980 B1 | 11/2005 | Mattsson |
| 6,963,981 B1 | 11/2005 | Bailey et al. |
| 6,970,432 B1 | 11/2005 | Hankins et al. |
| 6,973,490 B1 | 12/2005 | Robertson et al. |
| 6,976,090 B2 | 12/2005 | Ben-Shaul et al. |
| 6,981,050 B1 | 12/2005 | Tobias et al. |
| 6,981,180 B1 | 12/2005 | Bailey et al. |
| 6,996,616 B1 | 2/2006 | Leighton et al. |
| 6,999,988 B2 | 2/2006 | Buddhikot et al. |
| 7,003,572 B1 | 2/2006 | Lownsbrough et al. |
| 7,007,089 B2 | 2/2006 | Freedman |
| 7,010,578 B1 | 3/2006 | Lewin et al. |
| 7,012,900 B1 | 3/2006 | Riddle |
| 7,013,342 B2 | 3/2006 | Riddle |
| 7,024,466 B2 * | 4/2006 | Outten ................ G06F 21/10 709/203 |
| 7,032,072 B1 | 4/2006 | Quinn et al. |
| 7,039,633 B1 | 5/2006 | Dey et al. |
| 7,047,300 B1 | 5/2006 | Oehrke et al. |
| 7,054,902 B2 | 5/2006 | Toporek et al. |
| 7,054,935 B2 | 5/2006 | Farber et al. |
| 7,058,706 B1 | 6/2006 | Iyer et al. |
| 7,069,177 B2 | 6/2006 | Carley |
| 7,096,266 B2 | 8/2006 | Lewin et al. |
| 7,103,564 B1 | 9/2006 | Ehnebuske |
| 7,103,645 B2 | 9/2006 | Leighton et al. |
| 7,110,984 B1 | 9/2006 | Spagna |
| 7,117,259 B1 | 10/2006 | Rohwer |
| 7,133,905 B2 * | 11/2006 | Dilley ................ H04L 29/06 709/219 |
| 7,185,052 B2 | 2/2007 | Day |
| 7,188,085 B2 | 3/2007 | Pelletier |
| 7,206,748 B1 | 4/2007 | Gruse |
| 7,219,153 B1 | 5/2007 | Day |
| 7,254,645 B2 | 8/2007 | Nishi |
| 7,274,658 B2 * | 9/2007 | Bornstein ............... H04L 45/00 370/227 |
| 7,359,955 B2 | 4/2008 | Menon et al. |
| 7,373,644 B2 | 5/2008 | Aborn |
| 7,552,233 B2 * | 6/2009 | Raju ................ G06F 12/1483 709/238 |
| 7,562,153 B2 | 7/2009 | Biliris et al. |
| 7,577,754 B2 | 8/2009 | Garcia-Luna-Aceves et al. |
| 8,332,484 B2 * | 12/2012 | Afergan ................ H04L 67/14 709/218 |
| 8,417,816 B2 * | 4/2013 | Esteban ............... H04L 67/2842 709/226 |
| 8,930,538 B2 | 1/2015 | Fullagar et al. |
| 8,949,533 B2 * | 2/2015 | Puthalath ............ H04L 67/1095 711/119 |
| 10,462,252 B2 * | 10/2019 | Newton ............... H04L 67/2842 |
| 2001/0027491 A1 | 10/2001 | Terretta |
| 2001/0029525 A1 | 10/2001 | Lahr |
| 2001/0049732 A1 | 12/2001 | Raciborski et al. |
| 2001/0051980 A1 | 12/2001 | Raciborski et al. |
| 2001/0056500 A1 | 12/2001 | Farber et al. |
| 2002/0010798 A1 | 1/2002 | Ben-Shaul et al. |
| 2002/0016831 A1 | 2/2002 | Peled et al. |
| 2002/0016835 A1 | 2/2002 | Gamerman |
| 2002/0018449 A1 | 2/2002 | Ricciulli |
| 2002/0023164 A1 | 2/2002 | Lahr |
| 2002/0023165 A1 | 2/2002 | Lahr |
| 2002/0040404 A1 | 4/2002 | Lahr |
| 2002/0042817 A1 | 4/2002 | Lahr |
| 2002/0046273 A1 | 4/2002 | Lahr et al. |
| 2002/0046405 A1 | 4/2002 | Lahr |
| 2002/0049857 A1 | 4/2002 | Farber et al. |
| 2002/0059592 A1 | 5/2002 | Kiraly |
| 2002/0066038 A1 | 5/2002 | Mattsson |
| 2002/0073199 A1 | 6/2002 | Levine et al. |
| 2002/0078233 A1 | 6/2002 | Biliris et al. |
| 2002/0082999 A1 | 6/2002 | Lee et al. |
| 2002/0083124 A1 | 6/2002 | Knox et al. |
| 2002/0087797 A1 | 7/2002 | Adrangi |
| 2002/0089470 A1 | 7/2002 | Raman et al. |
| 2002/0092026 A1 | 7/2002 | Janniello et al. |
| 2002/0099850 A1 | 7/2002 | Farber et al. |
| 2002/0116444 A1 | 8/2002 | Chaudhri et al. |
| 2002/0124080 A1 | 9/2002 | Leighton |
| 2002/0129134 A1 | 9/2002 | Leighton et al. |
| 2002/0131645 A1 | 9/2002 | Hamilton |
| 2002/0133537 A1 | 9/2002 | Lau |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0152318 A1 | 10/2002 | Menon et al. |
| 2002/0163882 A1 | 11/2002 | Bornstein et al. |
| 2002/0174168 A1 | 11/2002 | Beukema et al. |
| 2002/0184357 A1 | 12/2002 | Traversat et al. |
| 2002/0198953 A1 | 12/2002 | O'Rourke et al. |
| 2002/0199016 A1 | 12/2002 | Freedman |
| 2003/0009444 A1 | 1/2003 | Eidler et al. |
| 2003/0018966 A1 | 1/2003 | Cook et al. |
| 2003/0028623 A1 | 2/2003 | Hennessey et al. |
| 2003/0028626 A1 | 2/2003 | Hennessey et al. |
| 2003/0028777 A1 | 2/2003 | Hennessey et al. |
| 2003/0031176 A1 | 2/2003 | Sim |
| 2003/0055972 A1 | 3/2003 | Fuller et al. |
| 2003/0061263 A1 | 3/2003 | Riddle |
| 2003/0061280 A1 | 3/2003 | Bulson et al. |
| 2003/0065703 A1 | 4/2003 | Aborn |
| 2003/0065762 A1 | 4/2003 | Stolorz et al. |
| 2003/0078888 A1 | 4/2003 | Lee et al. |
| 2003/0078889 A1 | 4/2003 | Lee et al. |
| 2003/0079027 A1 | 4/2003 | Slocombe et al. |
| 2003/0095660 A1 | 5/2003 | Lee et al. |

(56) References Cited

U.S. PATENT DOCUMENTS

| | | | |
|---|---|---|---|
| 2003/0105604 A1 | 6/2003 | Ash et al. |
| 2003/0112792 A1 | 6/2003 | Cranor et al. |
| 2003/0140111 A1 | 7/2003 | Pace et al. |
| 2003/0149581 A1 | 8/2003 | Chaudhri et al. |
| 2003/0154239 A1 | 8/2003 | Davis et al. |
| 2003/0158923 A1 | 8/2003 | Burkhart |
| 2003/0158928 A1 | 8/2003 | Knox et al. |
| 2004/0010588 A1 | 1/2004 | Slater et al. |
| 2004/0022194 A1 | 2/2004 | Ricciulli |
| 2004/0064832 A1 | 4/2004 | Tsukidate et al. |
| 2004/0139097 A1 | 7/2004 | Farber et al. |
| 2004/0162871 A1 | 8/2004 | Pabla et al. |
| 2004/0177148 A1 | 9/2004 | Tsimelzon, Jr. |
| 2004/0205162 A1 | 10/2004 | Parikh |
| 2004/0221019 A1* | 11/2004 | Swildens ............ H04L 67/1008 709/217 |
| 2005/0010653 A1 | 1/2005 | McCanne |
| 2005/0021863 A1 | 1/2005 | Jungck |
| 2005/0033858 A1 | 2/2005 | Swildens et al. |
| 2005/0038851 A1 | 2/2005 | Kriegsman |
| 2005/0060493 A1 | 3/2005 | Krissell et al. |
| 2005/0100027 A1 | 5/2005 | Leinwand et al. |
| 2005/0114296 A1 | 5/2005 | Farber et al. |
| 2005/0240966 A1 | 10/2005 | Hindle et al. |
| 2005/0262104 A1 | 11/2005 | Robertson et al. |
| 2006/0015574 A1 | 1/2006 | Seed et al. |
| 2006/0112176 A1 | 5/2006 | Liu et al. |
| 2006/0143293 A1 | 6/2006 | Freedman |
| 2007/0055764 A1 | 3/2007 | Dilley et al. |
| 2008/0065724 A1 | 3/2008 | Seed et al. |
| 2008/0071859 A1 | 3/2008 | Seed et al. |
| 2008/0147866 A1 | 6/2008 | Stolorz et al. |
| 2008/0215718 A1 | 9/2008 | Stolorz et al. |
| 2009/0254661 A1 | 10/2009 | Fullagar et al. |
| 2010/0169772 A1 | 7/2010 | Stallings et al. |
| 2010/0257258 A1 | 10/2010 | Liu et al. |
| 2010/0312861 A1 | 12/2010 | Kolhi et al. |
| 2010/0332595 A1 | 12/2010 | Fullagar et al. |
| 2011/0099290 A1 | 4/2011 | Swildens et al. |
| 2011/0145386 A1 | 6/2011 | Stolorz et al. |
| 2011/0320592 A1* | 12/2011 | Kemmerer, Jr. .... H04L 67/2852 709/224 |
| 2017/0339241 A1 | 11/2017 | Newton |

FOREIGN PATENT DOCUMENTS

| | | |
|---|---|---|
| CA | 2288488 | 6/2000 |
| CA | 2335661 | 3/2001 |
| CA | 2335662 | 3/2001 |
| CA | 2467998 | 4/2006 |
| CN | ZL99810853.7 | 8/1999 |
| CN | 1264476 A | 8/2000 |
| EP | 0649121 | 4/1995 |
| EP | 0651554 | 5/1995 |
| EP | 0801487 A2 | 10/1997 |
| EP | 0817444 A2 | 1/1998 |
| EP | 0824236 A2 | 2/1998 |
| EP | 0865180 A2 | 9/1998 |
| EP | 1063831 A2 | 12/2000 |
| EP | 1104555 | 6/2001 |
| GB | 2281793 A1 | 3/1995 |
| GB | 2353877 | 4/2004 |
| IL | 140935 | 3/2006 |
| JP | 05162529 | 6/1993 |
| JP | 07066829 | 3/1995 |
| JP | 08328583 | 12/1996 |
| JP | 10027148 A2 | 1/1998 |
| JP | 10093552 | 4/1998 |
| JP | 2000207270 | 7/2000 |
| JP | 2001007844 | 1/2001 |
| JP | 2001290787 | 10/2001 |
| JP | 2001312434 | 11/2001 |
| JP | 2002522995 | 7/2002 |
| JP | 3566626 | 6/2004 |
| JP | 2005124165 | 5/2005 |
| JP | 3762649 | 1/2006 |
| KR | 20010023599 | 3/2001 |
| TW | NI176482 | 8/2003 |
| WO | WO-1996042041 A2 | 12/1996 |
| WO | WO-1997011429 A1 | 3/1997 |
| WO | WO-1997029423 A1 | 8/1997 |
| WO | WO-199742582 | 11/1997 |
| WO | WO-1998004985 A1 | 2/1998 |
| WO | WO-1998006033 A1 | 2/1998 |
| WO | WO-199859486 | 12/1998 |
| WO | WO-199917227 | 4/1999 |
| WO | WO-199948246 | 9/1999 |
| WO | WO-199953422 | 10/1999 |
| WO | WO-2000029990 A1 | 5/2000 |
| WO | WO-2000052594 | 9/2000 |
| WO | WO-2000060861 | 10/2000 |
| WO | WO-200193533 | 12/2001 |
| WO | WO-2003088065 | 10/2003 |
| WO | WO-2009108593 | 9/2009 |
| WO | WO-2009123868 A3 | 10/2009 |
| WO | WO-2012037039 A1 | 3/2012 |

OTHER PUBLICATIONS

Canada Examination Report, dated Aug. 16, 2013, Application No. 2,720,353, filed Mar. 21, 2009; 3 pgs.
Canadian Examination Report, dated Jun. 13, 2017, Application No. 2,811,210, filed Sep. 12, 2011; 3 pgs.
Canadian Examination Report, dated Sep. 8, 2014, Application No. 2,720,353, filed Mar. 21, 2009; 4 pgs.
Chinese Examination Report, dated Jun. 13, 2012, Application No. 200980120043.0, 6 pgs.
European Examination Report, dated Mar. 30, 2016, Application No. 09727342.9, filed Mar. 21, 2009; 4 pgs.
Exporting Web Server Final Report, http://www.cs.technion.ac.il/Labs/Lccn/projects/spring97/project4/final_report.html (downloaded Jul. 7, 2007).
Extended European Search Report dated Dec. 6, 2011, App. No. 10178695.2, 7 pgs.
Extended European Search Report, dated Nov. 9, 2015, Application No. 11825742.7, filed Sep. 12, 2011; 6 pgs.
IBM Technical Disclosure Bulletin; Local Area Network Server Replacement Procedure, vol. 38, No. 1 , 235-236.
International Preliminary Report on Patentability, dated Mar. 19, 2013, Int'l Appl. No. PCT/US11/051252, Int'l Filing Date Sep. 12, 2011, 6 pgs.
International Search Report, dated Jan. 23, 2012, Intl Appl. No. PCT/US11/51252, Intl Filing Date Sep. 12, 2011, 3 pgs.
JP 10(1998)-27148 machine translation prepared by Japanese Patent Office (JPO), published Jan. 27, 1998, Title: "Server System for Internet," Applicant: Hitachi , 23 pgs.
Patent Abstracts of Japan "Server System for Internet", Pub. No. 10-027148, pub. date Jan. 27, 1998, Applicant: Hitachi, computer translation , 12 pgs.
Patent Abstracts of Japan, "Electronic Mail Multiplexing System and Communication Control Method in the System," (Appln. No. JP19930162529), (Jun. 30, 1993) (Pub. No. JP 7066829).
Patent Abstracts of Japan, "Method and Device for Repeating and Converting Information", (Appln. No. JP19960328583) (Pub. No. JP10171727) Jun. 26, 1998.
Supplemental European Search Report, dated Nov. 5, 2012, Application No. 09727342.9, 7 pgs.
Written Opinion, dated Jan. 23, 2012, Intl Appl No. PCT/US11/51252, Intl Filing Date Sep. 12, 2011, 5 pgs.
Adler, R. M. "Distributed Coordination Models for Client/Server Computing", Computer 28, 4 Apr. 1, 1995, 14-22.
Aggarwal, A. et al., "Performance of Dynamic Replication Schemes for an Internet Hosting Service", Technical Report, AT&T Labs Oct. 1, 1998.
Almeroth, K. et al., "Scalable Delivery of Web Pages Using Cyclic Best-Effort (UDP) Multicast", *IEEE INFOCOM* San Francisco, California, USA Jun. 1, 1998.

(56) References Cited

OTHER PUBLICATIONS

Andresen, D. et al., "Multiprocessor scheduling with client resources to improve the response time of WWW applications", *ACM Press*, NY, Proc. 11th Inti Conf. on Supercomputing (Austria, ICS '97) Jul. 1, 1997, 92-99.

Andresen, et al., "SWEB: Towards a Scalable World Wide Web Server on Multicomputers", Proc. IPPS Apr. 15, 1996, 850-856.

Awerbuch, et al., "Competitive Distributed File Allocation", in Proc. of the 25th Ann. ACM Symp. on Theory of Computing May 1, 1993, pp. 164-173.

Awerbuch, B. et al., "Distributed Paging for General Networks", In Proc. of the 7th ACM-SIAM Symposium on Discrete Algorithms, Jan. 1, 1996, pp. 574-583.

Baentsch, M et al., "Enhancing the Web's Infrastructure: From Caching to Replication", IEEE Internet Computing, 1(2):18-27.

Baentsch, M. et al., "Introducing Application-Level Replication and Naming into Today's Web", *Computer Networks and ISDN Systems* vol. 28, Nos. 7-11 May 1, 1996, pp. 921-930.

Bartal, Y. et al., "Competitive Algorithms for Distributed Data Management", 24th Annual ACM STOC, May 1992, Victoria, B.C. Canada.

Basturk, E. et al., "Using network layer anycast for load distribution in the Internet", Tech. Rep., IBM TJ. Watson Research Center Jul. 1, 1997, 21 pgs.

Berners-Lee, T. et al., RFC 1738—Uniform Resource Locators Dec. 1, 1994, pp. 1-25.

Berners-Lee, T. et al., "Hypertext Markup Language—2.0", Internet Engineering Task Force (IETF) Request for Comments (RFC) 1866 Nov. 1, 1995, pp. 1-77.

Berners-Lee, T. et al., "Hypertext Transfer Protocol—HTTP/1.0", Internet Engineering Task Force (IETF) Request for Comments (RFC) 1945 May 1, 1996, pp. 1-60.

Berners-Lee, T. et al., "Hypertext Transfer Protocol—HTTP/1.0", Internet Engineering Task Force (IETF), Internet Draft, draft-ietf-http-v10-spec-00.ps. Mar. 1, 1995, pp. 1-59.

Berra, P. B. et al., "Architecture for Distributed Database Systems", *Computer Communications* vol. 13, No. 4 May 1, 1990, pp. 217-231.

Bestavros, A. Demand-Based Document Dissemination to Reduce Traffic and Balance Load in Distributed Information Systems, In Proc. IEEE Symp. on Parallel and Distributed Processing, San Antonio, TX , 8 pgs.

Bestavros, et al., "Server-Initiated Document Dissemination for the WWW", IEEE Data Engineering Bulletin , 19(3): 3-11.

Bestavros, A. Speculative Data Disserrnination and Service to Reduce Server Load Network Traffic and Service Time in Distributed Information Systems, In Proc. ICDE '96: The 1996 Int'l Conf. on Data Engineering , 4 Pages.

Bhattacharjee, S. et al., "Application-Layer Anycasting", in *Proc. IEEE INFOCOM '97* Apr. 1, 1997, 9 pgs.

Braun, H. et al., "Web traffic characterization: an assessment of the impact of caching documents from NCSA's web server", Comput. Netw. ISDN Syst. 28, 1-2 , 37-51.

Brisco, T. DNS Support for Load Balancing, IETF RFC 1794 Apr. 1, 1995, pp. 1-7.

Carter, et al., "Dynamic server selection using bandwidth probing in wide-area networks", Tech. Rep. BU-CS-96-007, Compo Sci. Dept., Boston University , 1-20.

Carter, et al., "Server selection using dynamic path characterization in Wide-Area Networks", IEEE INFOCOM '97 Jan. 1, 1997, pp. 1014-1021.

Carter, J. L. et al., "Universal Classes of Hash Functions", *Journal of Computer and System Sciences* vol. 18, No. 2 Apr. 1, 1979, 106-112.

Cate, V. Alex: a global file system, in Proc. Usenix Conf. on File Systems May 1, 1992, pp. 1-11.

Chankhunthod, A. et al., "A Hierarchical Internet Object Cache", *Proc. of the 1996 USENIX Technical Conf.* , 153-163.

Cohen, J. et al., "Cache Array Routing Protocol v1.1", http://tools.ietf.org/id/draft-vinod-carp-v1-01.txt (Last-Modified: Wed, Oct. 1, 1997) , 8 pages.

Colajanni, et al., "Adaptive TTL schemes for load balancing of distributed Web servers", SIGMETRICS Perform. Eval. Rev. 25,2 , 36-42.

Colajanni, M. et al., "Scheduling Algorithms for Distributed Web Servers", Intl Conf. on Distributed Computing Systems (ICDCS), Baltimore, Maryland, USA May 1, 1997, pp. 169-176.

Crovella, et al., "Dynamic server selection in the Internet", 3rd IEEE Workshop on the Arch. and Implementation of High Performance Computer Sys. '95 , pp. 158-162.

Danzig, P. B. et al., "An analysis of wide-area name server traffic: a study of the Internet Domain Name System", Conf. Proc. Communications Architectures & Protocols; D. Oran, Ed. SIGCOMM '92; ACM Press, New York, NY , 281-292.

De Bra, P.M.E. et al., "Information Retrieval in the World Wide Web: Making Client-Based Searching Feasible", Computer Networks and ISDN System, NL, North Holland Publishing, Amsterdam, vol. 27, No. 2, ISSN: 0169-7552 Nov. 1, 1994, 183-192.

Deering, S. E. et al., "Multicast routing in datagram internetworks and extended LANs", ACM Trans.Comput. Syst. 8,2 , 85-110.

Doi, K. Super Proxy Script—How to make distributed proxy servers by URL hashing, Sharp Corp., http://naragw.sharp.co.jp/sps/; download Jul. 7, 2007.

Eriksson, H. Mbone: The Multicast Backbone, *Communications of the ACM* vol. 37, No. 8 Aug. 1, 1994, pp. 54-60.

Feeley, M. et al., "Implementing Global Memory Management in a Workstation Cluster", In Proc. 15th ACM Symp. on Operating Systems Principles , 201-212.

Fielding, R. et al., "Hypertext Transfer Protocol—HTTP/1.1", Internet Engineering Task Force (IETF) Internet Draft, draft-ietf-http-v11-spec-00.txt Nov. 1, 1995, pp. 1-81.

Fielding, R. et al., "Hypertext Transfer Protocol—HTTP/1.1", Internet Engineering Task Force (IETF) Request for Comments (RFC) 2068 Jan. 1, 1997, pp. 1-162.

Floyd, S. et al., "A Reliable Multicast Framework for Light-Weight Sessions and Application Level Framing", In Proc. of ACM SIGCOMM '95, Aug. 1, 1995, 342-356.

Fox, A. et al., "A Framework for Separating Server Scalability and Availability from Internet Application Functionality", PhD thesis, University of California, Berkeley, Jan. 1, 1998, 163 pgs.

Fox, A. et al., "Cluster-based scalable network services", Proc. 16th ACM Symp. on Operating Systems Principles (Saint Malo, France, Oct. 5-8, 1997), W. M. Waite, Ed. SOSP '97. ACM Press, New York, NY , 78-91.

Gadde, S. et al., "Reduce, reuse, recycle: An approach to building large internet caches", in Workshop on Hot Topics in Operating Systems (HotOS) Apr. 1, 1997, pp. 93-98.

Goldszmidt, M. et al., "Load Distribution for Scalable Web Servers: Summer Olympics 1996—A Case Study", In Proc. 8th IFIPIIEEE Int'l Workshop on Distributed Systems: Operations and Management, Sydney, Australia. , 10 pgs.

Grigni, M. et al., "Tight Bounds on Minimum Broadcasts Networks", SIAM J. Disc. Math. 4 (May 1991) , 207-222.

Guyton, et al., "Locating nearby copies of replicated Internet servers", Proc. ACM SIGCOMM '95; pp. 288-298 Oct. 1, 1995.

Gwertzman, J. et al., "The Case for Geographical Push-Caching", Proc. Workshop on Hot OS '95 , 51-55.

Gwertzman, J. et al., "World-Wide Web Cache Consistency", Proc. 1996 USENIX Tech. Conf., pp. 141-151, San Diego, CA.

Jeffery, C. et al., "Proxy sharing proxy servers", In Proc. IEEE etaCOM Conf. May 1, 1996, pp. 116-119.

Karger, D. et al., "Consistent Hashing and Random Trees: Distributed Caching Protocols for Relieving Hot Spots on the World Wide Web", In Proc. 29th Annual ACM Symp. on Theory of Computing May 1, 1997, 654-663.

Kim, Y. J. et al., "Clustered multi-media NOD: Popularity-based article prefetching and placement", Sixteenth IEEE Symp. on Mass Storage Systems, San Diego, CA , pp. 194-202.

Korkea-Aho, M. Scalability in Distributed Multimedia Systems, Technical report TKO-B128, Helsinki University of Technology.

(56) References Cited

OTHER PUBLICATIONS

Kostadinova, R. Peer-to-Peer Video Streaming, [online; retrieved on Jan. 25, 2013]; Retrieved from the Internet <URL: http://www.ee.kth.se/php/modules/publications/reports/2008/XR-EE-LCN_2008_004.pdf>, especially section 5.4.1 Jan. 1, 2008, 1-53.
Krishnamurthy, B. et al., "Study of piggyback cache validation for proxy caches in the World Wide Web", in: Symp. on Internet Technology and Systems, USENIX Association.
Kroeger, T. M. et al., "Exploring the Bounds of Web Latency Reduction from Caching and Prefetching", Proc. Usenix Symp. Internet Technologies and Systems, USENIX Dec. 1, 1997, pp. 13-22.
Kwan, et al., "NCSA's World Wide Web Server: Design and Performance", IEEE , pp. 68-74.
Little, T.D. C. et al., "Selection and Dissemination of Digital Video via the Virtual Video Browser", *Multimedia Tools and Applications* vol. 1, No. 2 (Netherlands) , pp. 149-172.
Luotonen, et al., "World-Wide Web Proxies", *CERN* modified May 24, 1994 , 1-8.
Malkin, G. RIP Version 2 Carrying Additional Information, Internet Engineering Task Force (IETF) Request for Comments (RFC) 1388 Jan. 1, 1993, pp. 1-7.
Malpani, R. et al., "Making World Wide Web Caching Servers Cooperate", In Proc. 4th Int'l. World Wide Web Conf. (downloaded from http://www.w3.org/ConferenceslWWW4/Papers/59/ on Jul. 7, 2007), 10 pages.
Mockapetris, P. Domain Names—Concepts and Facilities, IETF RFC 1034 Nov. 1, 1987, 55 pgs.
Mockapetris, P. Domain Names—Implementation and Specification, IETF RFC 1035 Nov. 1, 1987, 55 pgs.
Mourad, et al., "Scalable Web Server Architectures", iscc, 2nd IEEE Symposium on Computers and Communications (ISCC '97) Jul. 1, 1997, pp. 12-16.
Moy, J. OSPF Version 2, Internet Engineering Task Force (IETF) Request for Comments (RFC) 1583 Mar. 1, 1994, 132 pgs.
Niki, Hitoshi Storage Network, *Computopia* vol. 36, No. 415, Japan, Computer Age Co., Ltd. (translation) Apr. 1, 2001, p. 52.
Oguchi, et al., "A Study of Caching Proxy Mechanisms Realized on Wide Area Distributed Networks", High Performance Distributed Computing, 5th Int'l Symposium Aug. 1, 1996, pp. 443-449.
Palmer, M. et al., "Fido: A Cache that Learns to Fetch", In Proc. the 17th Int'l Conf. on Very Large Data Bases , 255-264.
Panigrahy, R. Relieving Hot Spots on the World Wide Web, Master's thesis, MIT EECS Jun. 1, 1997, pp. 1-66.
Parris, C. et al., "A Dynamic Connection Management Scheme for Guaranteed Performance Services in Packet-Switching Integrated Services Networks", UC Berkeley Computer Science Division Tech. Report TR-93-005 Jan. 1, 1993, 37 pgs.
Parris, C. et al., "The Dynamic Management of Guaranteed Performance Connections in Packet Switched Integrated Service Networks", UC Berkeley Computer Science Division and International Computer Science Institute Tech. Report CSD-94-859 Jan. 1, 1994.
Partridge, C. et al., "Host Anycasting Service", Internet Engineering Task Force (IETF) Request for Comments (RFC) 1546 Nov. 1, 1993, pp. 1-9.
Petri, S. et al., "Load Balancing and Fault Tolerance in Workstation Clusters. Migrating Groups of Communicating Processes", Operating Systems Review, vol. 29, No. 4 , 25-36.
Plaxton, G. C. et al., "Fast Fault-Tolerant Concurrent Access to Shared Objects", In Proc. 37th IEEE Symp. of Foundations of Computer Science Oct. 1, 1996, pp. 570-579.
Povey, D. et al., "A distributed internet cache", in Proc. of the 20th Australasian Computer Science Conf.
Rabin, M. O. Efficient dispersal of information for security, load balancing, and fault tolerance, *J.ACM* 36, 2 , pp. 335-348.
Rabinovich, M. et al., "Dynamic Replication on the Internet Work Project No. 3116-17-7006", AT&T Labs Research.
Rabinovich, M. et al., "RaDaR: A Scalable Architecture for a Global Web Hosting Service", WWW8 May 1, 1999.
Reisslein, M. et al., "Interactive video streaming with proxy servers", in Proc. of First International Workshop on Intelligent Multimedia Computing and Networking (IMMCN) 2000 , pp. 1-16.
Rodriguez, P. et al., "Improving the WWW: Caching or Multicast?", *Computer Networks and ISDN Systems* North Holland Publishing, Amsterdam, NL, vol. 30, No. 22-23, ISSN: 0169-7552 , pp. 2223-2243.
Ross, K. W. Hash-Routing for Collections of Shared Web Caches, *IEEE Network Magazine* 11, 7:37-44 , pp. 1-21.
Sen, S. et al., "Proxy Prefix Caching for Multimedia Streams", *IEEE* Jun. 1, 1999, 10 pgs.
Smith, Neil What can Archives offer the World Wide Web?, Technical Report 11, University of Kent, Computing Laboratory, University of Kent, Canterbury, UK Mar. 1, 1994, 1-12.
Takahashi, Takao How to customize Apache Q&A—Web server using Apache, AI Publishing, Apr. 30, 1999, First Edition , pp. 63-64 (translation).
Thaler, D. G. et al., "Using name-based mappings to increase hit rates", IEEE/ACM Trans. Netw. 6,1 , 1-14.
Topolcic, C. Experimental Internet Stream Protocol, Version 2 (ST-II), Internet Engineering Task Force (IETF) Request for Comments (RFC) 1190 Oct. 1, 1990, pp. 1-148.
Touch, J. et al., "The X-Bone", Third Global Internet Mini-Conference at Globecom '98, Sydney, Australia (pp. 44-52 of mini-conference) Nov. 1, 1998, pp. 59-68.
Traina, P. BGP-4 Protocol Analysis, Internet Engineering Task Force (IETF) Request for Comments (RFC) 1774 Mar. 1, 1995, pp. 1-10.
Vin, H. Multimedia Broadcasting Over the Internet: Part 1, *IEEE Multimedia* IEEE Computer Society, US, vol. 5, NR. 4 , pp. 78-82.
Vitter, J. S. et al., "Optimal Prefetching via Data Compression", Proc. 32nd Annual IEEE Symposium on Foundations of Computer Science Oct. 1, 1991, 21 pages.
Wessels, D. Configuring Hierarchical Squid Caches, , 62 pgs.
Wessels, Duane Intelligent Caching for World-Wide Web Objects, Masters Thesis, University of Colorado (also presented at INET '95 in Jun. '95) Jan. 1, 1995, 1-85.
Wessels, D. et al., "Internet Cache Protocol (ICP), Version 2", Internet Engineering Task Force (IETF) Request for Comments (RFC) 2186 , pp. 1-9.
Wolfson, O. et al., "An Adaptive Data Replication Algorith", ACM Transactions on Database Systems (TODS) vol. 22(4) Jun. 1, 1997, pp. 255-314.
Xiao, Li et al., "Exploiting neglected data locality in browsers", in Proc. 10th Int'l World Wide Web Conference, (WWW10), Hong Kong (extended abstract) , 2 pgs.
European Decision to Refuse, dated Feb. 7, 2020, Application No. 09727342.9, filed Mar. 21, 2009; 15 pgs.

\* cited by examiner

FIG. 6

| SLOT | Time Bucket 1 | Time Bucket 2 | ... | Time Bucket 16 |
|------|---------------|---------------|-----|----------------|
|      |               |               | ... |                |
|      |               |               |     |                |
|      |               |               | ... |                |
|      |               |               | .. |                |

600

HANDLING LONG-TAIL CONTENT IN A CONTENT DELIVERY NETWORK (CDN)

CROSS-REFERENCE TO RELATED APPLICATIONS

This application is a continuation of and claims the benefit of priority from U.S. patent application Ser. No. 15/645,584, entitled "HANDLING LONG-TAIL CONTENT IN A CONTENT DELIVERY NETWORK (CDN)," filed Jul. 10, 2017, the entire contents of which are fully incorporated by reference herein for all purposes. Application Ser. No. 15/645,584 is a continuation of and claims the benefit of priority from U.S. patent application Ser. No. 12/880,324, entitled "HANDLING LONG-TAIL CONTENT IN A CONTENT DELIVERY NETWORK (CDN)," filed Sep. 13, 2010, the entire contents of which are fully incorporated by reference herein for all purposes. Application Ser. No. 12/880,324 is a continuation-in-part (CIP) of and claims the benefit of priority from U.S. patent application Ser. No. 12/408,681, entitled "HANDLING LONG-TAIL CONTENT IN A CONTENT DELIVERY NETWORK (CDN)," filed Mar. 21, 2009 (now U.S. Pat. No. 8,930,538 issued Jan. 6, 2015), the entire contents of which are fully incorporated by reference herein for all purposes. Application Ser. No. 12/408,681 claims priority as a non-provisional application from U.S. Provisional Application No. 61/042,412, entitled "HANDLING LONG-TAIL CONTENT IN A CONTENT DELIVERY NETWORK (CDN)," filed Apr. 4, 2008 the entire contents of which are fully incorporated by reference herein for all purposes.

This application is also related to the following co-owned and patent applications, the contents of each of which are fully incorporated herein by reference for all purposes: application Ser. No. 10/073,938 filed Feb. 14, 2002, application Ser. No. 11/715,316 filed Mar. 8, 2007, application Ser. No. 11/978,656 filed Oct. 30, 2007, Application Ser. No. 11/980,672 filed Oct. 31, 2007, application Ser. No. 10/259,497 filed Sep. 30, 2002, application Ser. No. 11/932,162 filed Oct. 31, 2007, application Ser. No. 11/976,648 filed Oct. 26, 2007, and application Ser. No. 12/390,560 filed Feb. 23, 2009.

FIELD OF THE INVENTION

This invention relates to content delivery, to content delivery networks (CDNs), and to frameworks and systems using CDNs.

DETAILED DESCRIPTION

Glossary

As used herein, unless stated otherwise, the following terms or abbreviations have the following meanings:
1. IP means Internet Protocol.
2. "IP address" means an address used in the Internet Protocol to identify electronic devices such as servers and the like.
3. HTTP means Hypertext Transfer Protocol.
4. URL means Uniform Resource Locator.
5. DNS means Domain Name System.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like referenced numerals designate corresponding parts throughout the several views.

FIG. 6 is an exemplary data structure for maintaining the popularity data for a particular popularity server.

OVERVIEW

The Internet and the so-called World Wide Web (the "WWW") have become ubiquitous. Thousands or even tens of thousands of so-called content providers (publishers) now use the Internet (and, particularly, the WWW) to provide all sorts of content to tens or even hundreds of thousands of clients all over the world.

In order to offload the job of serving some or all of their content, many content providers now subscribe to so-called content delivery networks (CDNs). Using a CDN, some (or all) of a content provider's content can be served to clients from the CDN (i.e., from one or more servers in the CDN) instead of from the content provider's server(s). In a caching CDN, content that is served may also be cached on some or all of the CDN servers, either before being served or in response to specific requests for that content.

The term content as used herein means any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content.

Certain publishers can have large content libraries in which only a small proportion of the content (the so-called "short head") is popular enough to benefit from serving through a caching CDN, while the majority of the content (the so-called "long tail") is accessed only occasionally and not generally worth caching (or even serving from an edge server). This situation would be typical for a content publisher with a very large music or video library. Some music content—the popular content—may be regularly requested, whereas other music—the not popular (also referred to as unpopular) content—may be seldom if ever requested.

Content can become popular (by various measures of popularity) or fade into relative obscurity dynamically, so a content library cannot easily be explicitly partitioned. Instead, the CDN tracks popularity of certain content, and selectively migrates content toward the edge (i.e., toward the tier 1 servers) as that content becomes popular.

Figure 1:
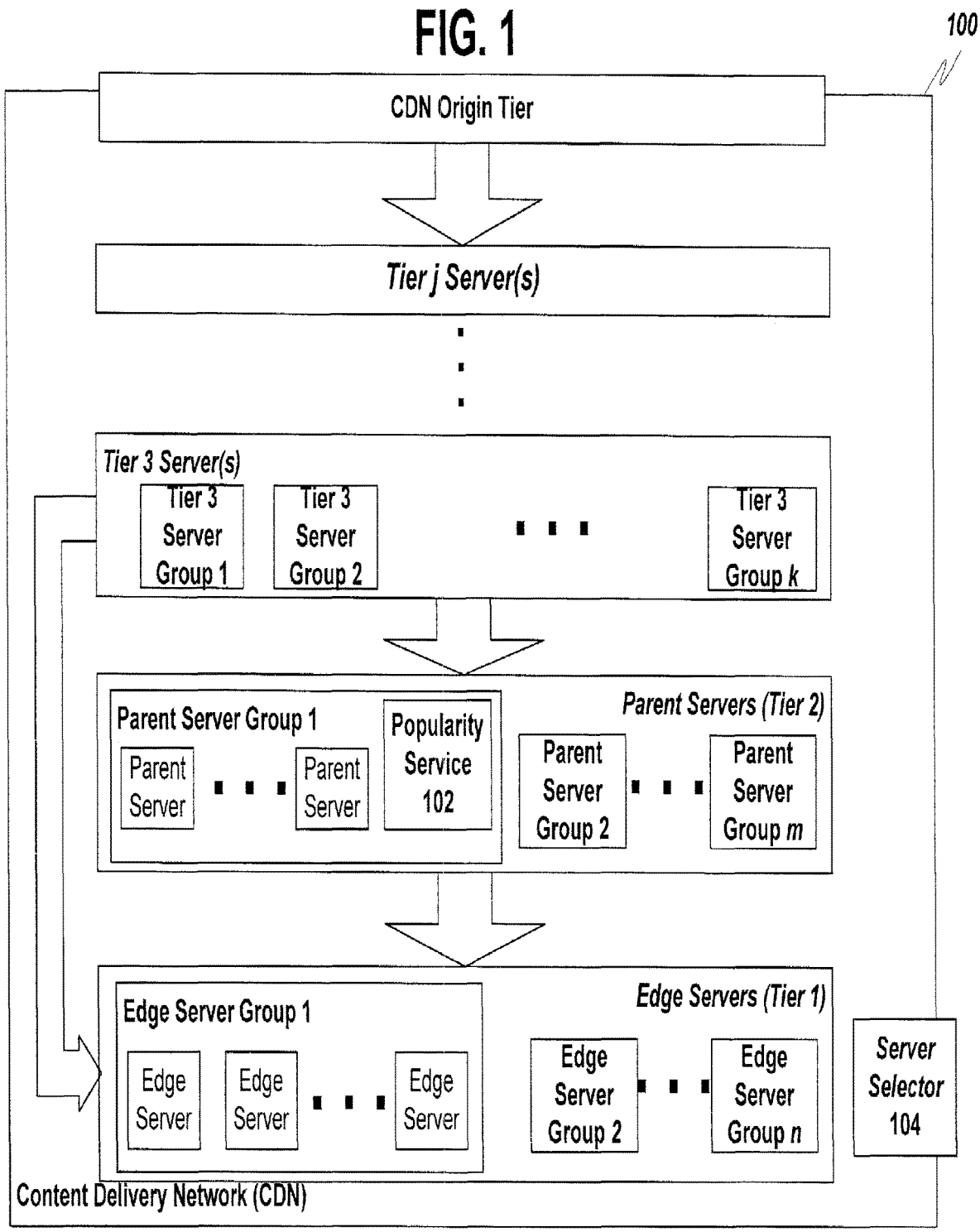
FIG. 1 depicts a general hierarchical, multi-tiered content delivery network (CDN)

A CDN may have one or more tiers of servers, organized hierarchically. FIG. 1 depicts a content delivery network 100 that includes multiple tiers of servers. Specifically, the CDN 100 of FIG. 1 shows j tiers of servers, denoted Tier 1, Tier 2, Tier 3, . . . , Tier j. Each tier of servers may comprise a number of servers organized into server groups (sometimes referred to as server clusters). The Tier 1 servers are also referred to as edge servers, and Tier 1 is sometimes also referred to as the "edge" or the "edge of the CDN." The Tier 2 servers (when present in a CDN) are also referred to as parent servers.

Furthermore, content stored in any of the intermediate tier servers (e.g., tier 2, tier 3, . . . tier j in FIG. 1) may be logically partitioned across two or more servers in the respective tier group. For example, a first portion (or subset) of a content provider's library may be stored on a first parent server in Group 1, a second portion may be stored on a second server in Group 1, and the last third may be stored on a third server in Group 1. Various partitioning methodologies are described in further detail below. In operation, the partitioning of content libraries across servers in an intermediate tier of a CDN provides a type of preemptive load-balancing such that certain parent servers are only responsible for handling a pre-defined subset of a content provider's library. In other words, redirected requests from the client to a parent/intermediate tier are distributed within the tier in accordance with the particular partitioning methodology being implemented.

For example, in the CDN 100 of FIG. 1, Tier 1 has n groups of servers (denoted "Edge Server Group 1", "Edge Server Group 2", " . . . , Edge Server Group n"); tier 2 (the parent servers' tier) has m server groups (the i-th group being denoted "Parent Server Group i"); and tier 3 has k server groups, and so on. Preferably each tier has the same number of server groups.

Figure 2:
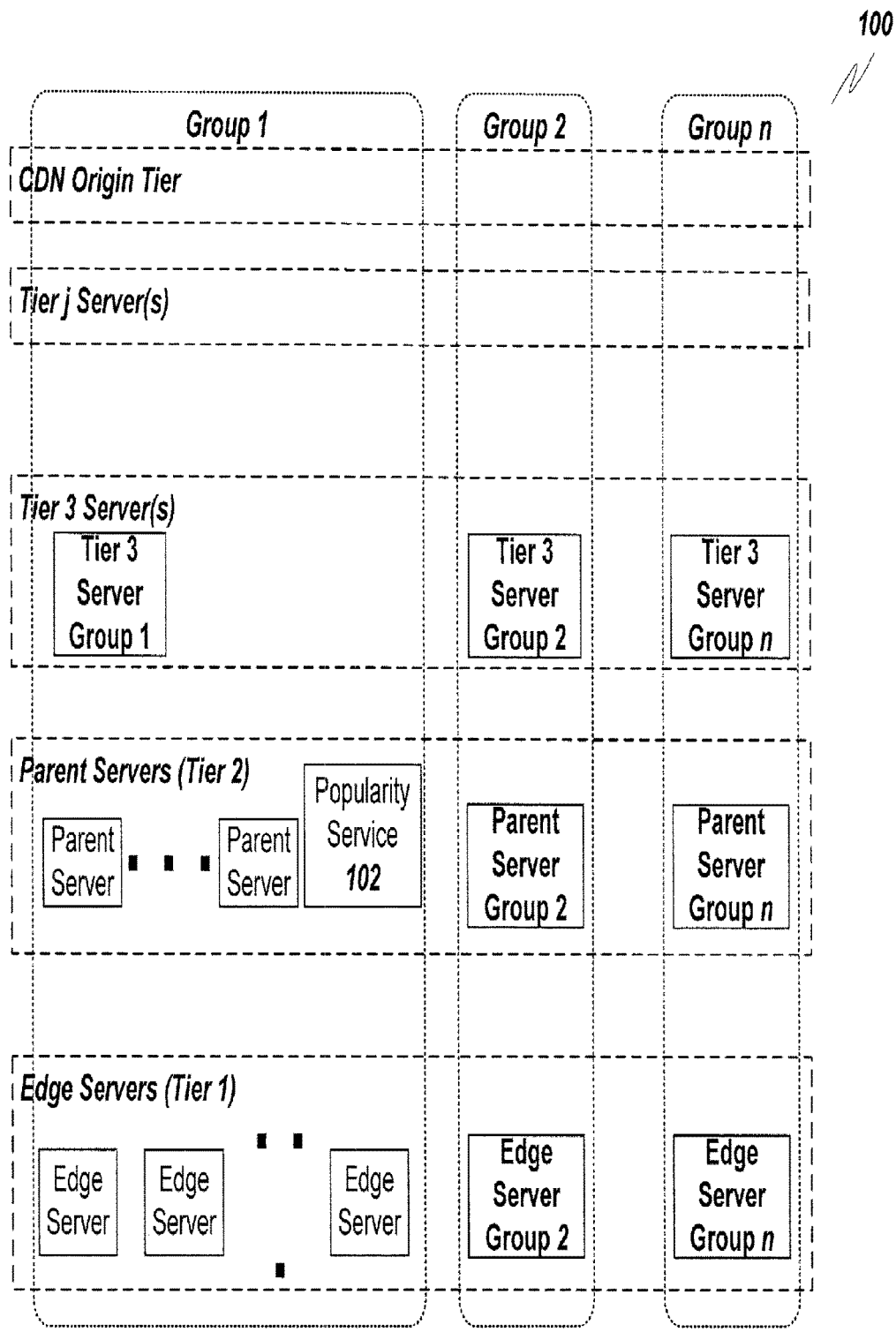
FIG. 2 shows the logical organization of servers into groups or clusters in a CDN.

FIG. 2 shows the logical organization/grouping of servers in a CDN of FIG. 1. In the exemplary CDN of FIG. 2, each tier of servers has the same number (n) of server groups. Those of skill in the art will know and understand, upon reading this description, that each server group may have the same or a different number of servers. Additionally, the number of servers in a server group may vary dynamically. For example, additional servers may be added to a server group to deal with increased load on the group.

The servers in a server group may be homogenous or heterogeneous, and each server in a server group may comprise a cluster of physical servers sharing the same name and/or network address. An example of such a cluster is described in co-owned patent application No. 61/064,339 (titled "Load-balancing cluster", filed Feb. 28, 2008), the entire contents of which are incorporated herein by reference for all purposes.

Servers in the same tier and the same group are referred to as peers or peer servers.

A typical CDN has only one or two tiers of servers. A CDN with only one tier will have only edge servers, whereas a CDN with two tiers will have edge servers and parent servers. (At a minimum, a CDN should have at least one tier of servers—the edge servers.)

The grouping of servers in a tier may be based, e.g., on their physical or geographical location. For example, a particular CDN may have six groups—four groups of servers in the United States, Group 1 for the West Coast, Group 2 for the mid-west, Group 3 for the northeast and Group 4 for the south east; and one group each for Europe and Asia.

A particular CDN server is preferably in only one server group.

In general, some or all of the servers in each tier can exchange data with some or all of the servers in each other tier. Thus, some or all of the parent servers can exchange information with some or all of the edge servers. For the sake of simplicity, in the drawings, each tier of servers is shown as being operationally connectable to each other tier. In some CDNs, however, it may be preferable that the servers in a particular tier can only exchange information with other servers in the same group (i.e., with peer servers) and/or with other servers in the same group in a different tier. For example, in some CDNs, the edge servers in edge server group k, can exchange information with each other and with all servers in parent server group k, and so on.

A content provider's/customer's server (or servers) are also referred to as origin servers. A content provider's origin servers may be owned and/or operated by that content provider or they may be servers provided and/or operated by a third party such as a hosting provider. The hosting provider for a particular content provider may also provide CDN services to that content provider.

A CDN may also include a CDN origin/content cache tier which may be used to cache content from the CDN's subscribers (i.e., from the CDN subscribers' respective origin servers). Those of skill in the art will know and understand, upon reading this description, that a CDN can support one or more subscribers, i.e., that a CDN can function as a shared infrastructure supporting numerous subscribers. The CDN origin tier may also consist of a number of servers, and these servers may also be organized (physically and logically) into a number of regions and/or groups. The server(s) in the CDN origin tier obtain content from the subscribers' origin servers, either on an as needed basis (a pull) or in advance (via a push).

A popularity service 102 (described in greater detail below) is associated with one or more of the server groups in one or more tiers. In a presently preferred exemplary embodiment, some of the parent server groups have popularity services 102 associated therewith. Although shown as a separate component of the group, the popularity service 102 may be integrated into one of the servers in the group. In some cases, the popularity service may have its own server, distinct from any of the CDN servers. The terms "popularity service" and "popularity server" are used interchangeable herein.

In operation, when a client requests content that is to be served using a content delivery framework, the client may be served that content from a server in the CDN or, in some cases, from the subscriber/customer's origin server.

A client may be directed to a CDN and/or to a server in the CDN in any manner using any kind of server selector system 104. As understood by those of skill in the art, the server selector system 104 generally operates to direct a client's requests for content to an appropriate server in order for that content to be served to the requesting client. An appropriate server may be one which is close to the client (by some measure of cost) and/or one which is not too heavily loaded. All sorts of conditions may be applied to the term "appropriate", and all sorts of information and tests, both static and dynamic, may be used to determine an appropriate server. The server selector system 106 may, e.g., include or operate fully or partially in Domain Name Service (DNS) servers, standalone devices, or a combination thereof. For example, the server selector system 106 may comprise a single level DNS server that selects an appropriate server based at least in part on some combination of the location of the requesting client and the load on some or all of the CDN servers. Those of skill in the art will know and understand, upon reading this description, that a client's location in a network such as the Internet may sometimes only be roughly determined, and the term "location of the client" is generally taken to be a network location corresponding to the client's network service provider.

Although shown as a component in the drawings, the server selector 106 may comprise numerous components. For example, some or all of the server selection may be based on anycast routing, and the server selector 106 may then include routers and associated tables.

In a presently preferred embodiment the server selector 106 is an intelligent traffic manager (ITM)/adaptive traffic controller (ATC) such as described in co-pending U.S. patent application Ser. No. 10/259,497, filed Sep. 30, 2002, and titled "Configurable Adaptive Global Traffic Control And Management," (published as US 2003-0065762 A1); and in U.S. patent application Ser. No. 11/976,648, filed Oct. 26, 2007, titled "Policy-based content delivery network selection," (collectively the "ITM applications"), the entire contents of each of which have been incorporated herein by reference for all purposes. In some embodiments the server selector 106 may include a "best" or "optimal" server selector such as disclosed in U.S. Pat. No. 6,185,598 titled, "Optimized Network Resource Location," the entire contents of which are incorporated herein by reference for all purposes. The '598 patent refers to CDN servers as so-called repeater servers, and describes a so-called "Best Repeater Selector (BRS) mechanism".

Figure 3:
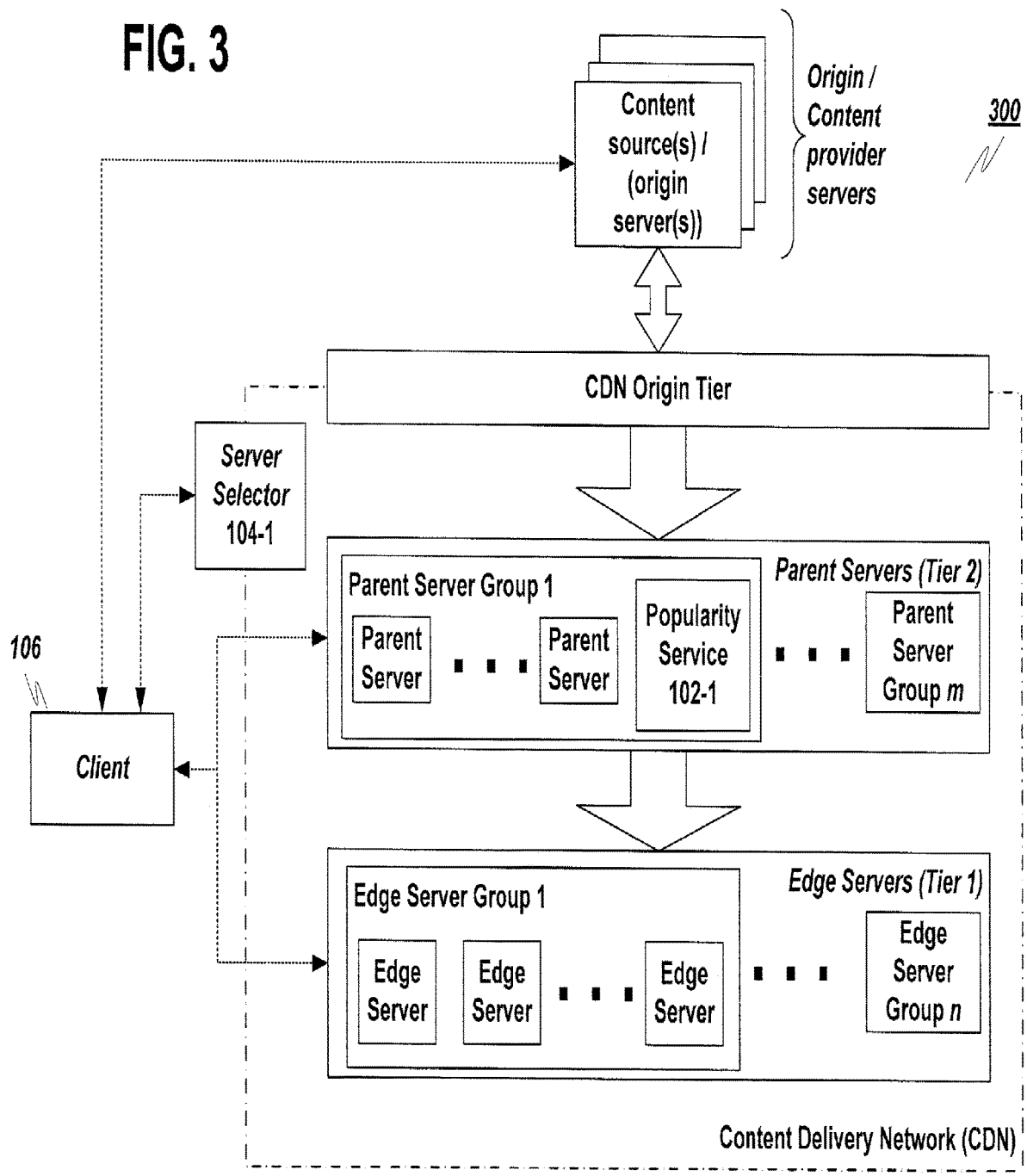
FIG. 3 depicts a content delivery framework (CDF) using a content delivery network (CDN)

FIG. 3 shows a content delivery framework 300 with a two-level hierarchical CDN consisting of a tier of edge servers (Tier 1) and a tier of parent servers (Tier 2). Some or all of the edge servers can communicate with some or all of the parent servers. The edge servers are divided into n edge server groups, and the parent servers are divided into m parent server groups. In a presently preferred embodiment, the value of m is equal to the value of n, i.e., in this presently preferred embodiment there are the same number of edge server groups as there are parent server groups. A CDN origin/content cache tier stores subscriber content which it obtains from the various subscribers' origin servers. At least one of the parent server groups (in the drawing, Group 1) has a popularity service 102-1 associated therewith. Preferably more than one parent server group has an associated popularity service, and more preferably each parent server group has an associated popularity service.

Although shown in a parent tier, the popularity service may located anywhere in the system, including in the edge tier.

The popularity service may be used by certain, though not necessarily all, content. When only certain content uses the popularity service, content should be designated in order to use the popularity service.

Some or all of the edge servers in a group may use a popularity service to manage the long-tail content of various subscribers. Each edge server that uses a popularity service is referred to as being bound to that popularity service. An edge server that is bound to a popularity service is sometimes referred to herein as a "longtail coserver."

Figure 4:
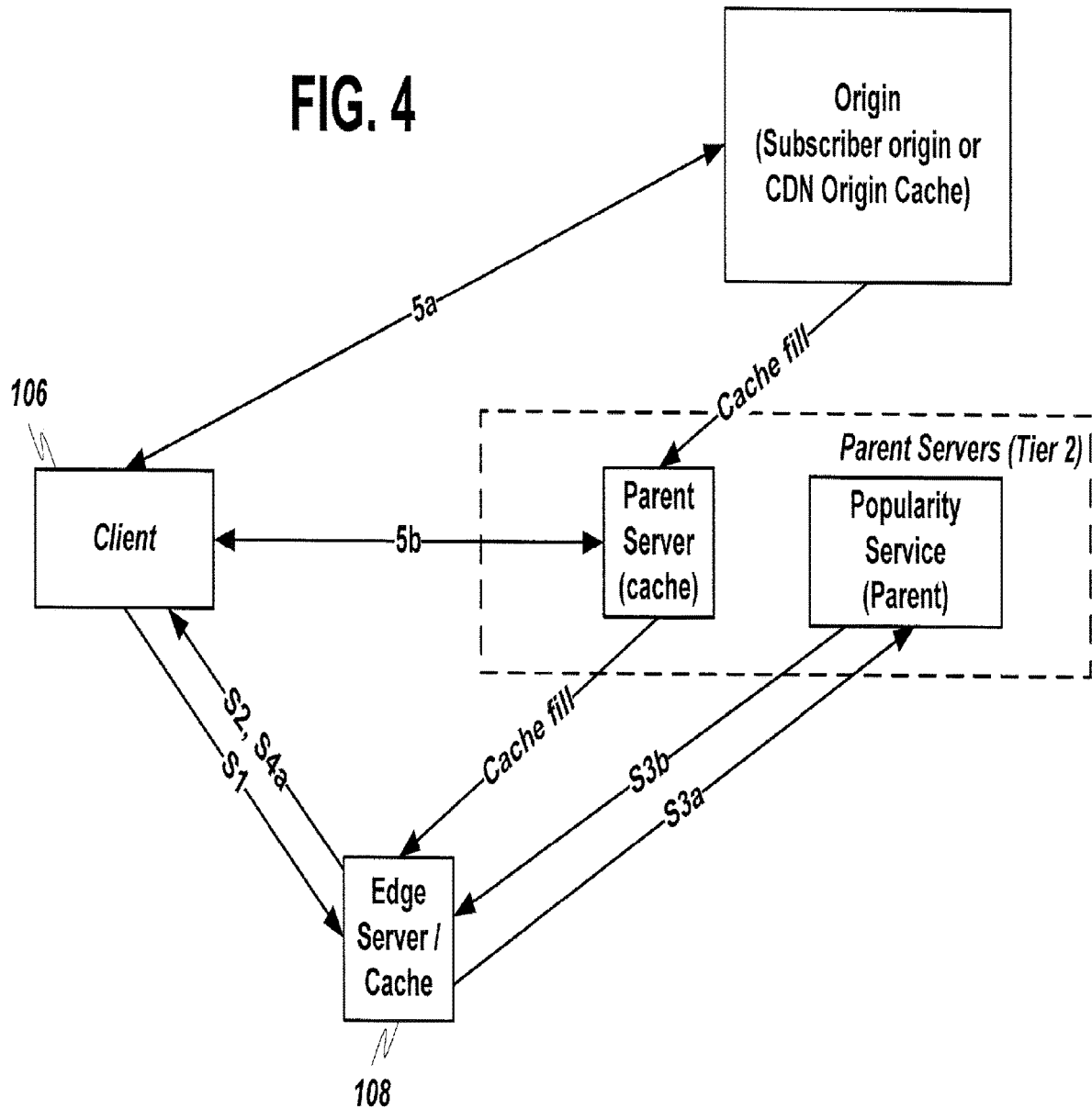
FIG. 4 depicts the operation of a two-level content delivery network in a content delivery framework.
Figure 5:
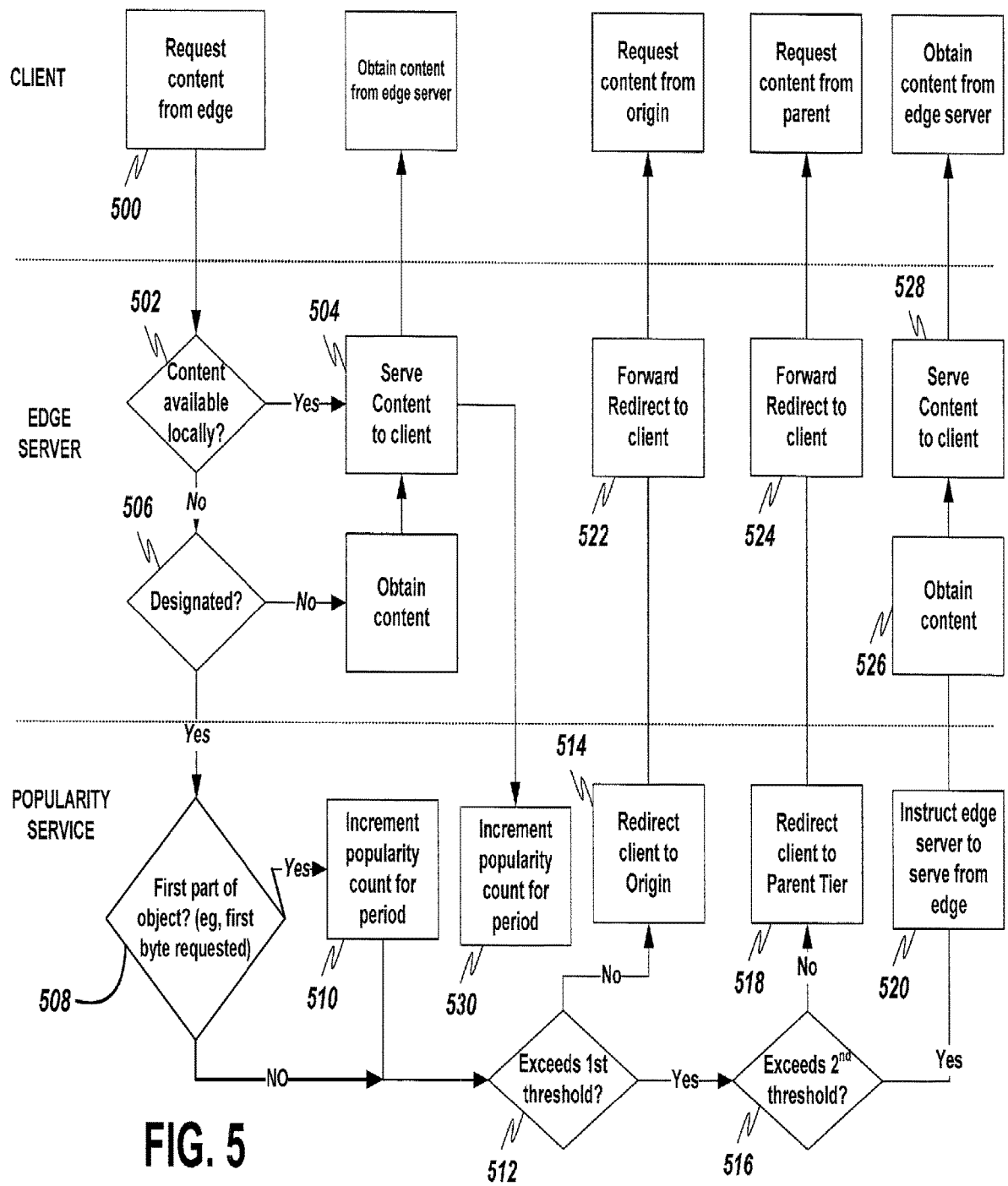
FIG. 5 is a flowchart showing operation of the popularity services of the CDN of FIG. 4.

FIGS. 4 and 5 show the operation of the popularity services of the CDN of FIG. 3.

When a client 106 requests content (e.g., using an HTTP GET request), that request is directed (e.g., by server selector 104-1) to an edge server in order for the content to be served to the client. For certain designated content a popularity check is interposed into the fill side of the caching operation. FIG. 4 illustrates the flow of messages and data in the content delivery framework 300, and FIG. 5 is a flowchart show operation of the popularity services of the CDN of FIG. 4. For the sake of this particular explanation, assume that the client's request has been directed to edge server 108. (Those of skill in the art will know and understand, upon reading this description, that the client's initial request may be directed to any tier in the CDN hierarchy, including, e.g., to the parent tier.) This server is selected using the server selection mechanisms 104-1 associated with the CDN, e.g., using one or more DNS servers and selecting an edge server based on such factors as the location of the requesting client, the load on the network, network traffic conditions, CDN policies, subscriber policies, and the like.

A client 104 requests content from an edge server 108 (at 500 in FIG. 5). The request from the client 104 arrives at edge server 108 (S1 in FIG. 4). The edge server 108 checks to see if object is present (locally or on a peer) and fresh (at 502). If so, the edge server 108 serves the object to the client 104 from the cache (S2, 504), obtaining the object from a peer, if necessary.

In some embodiments, the system may distinguish between on-net and off-net peers and same-switch peers. An on-net peer is a peer on the same backbone network; an off-net peer is a peer located on a different backbone network; and a same-switch peer is a peer directly connected to the same switch as the agent performing the check. In some embodiments, the edge server 108 may only look for the object on some of its peers (e.g., only on same-switch peers) (at 502).

If the object is not available on the edge server 108 or on a peer, the edge server 108 ascertains whether this object is served based on its popularity (i.e., whether this object has been designated so that the object's popularity will be used to determine where it will be served from) (at 506). If so, then the request is sent to the popularity service 102 associated with the edge server 108, in this case, to the popularity server for the this group (S3a).

The determination as to whether this object is designated to be served from a different location, depending on its popularity (at 506), may be made based, at least in part, on the name (hostname) used to request the object.

It is preferably to allow for a mix of edge servers, some performing popularity checking (as described above), while others do not. For those that are not running the popularity service, the name (hostname) used to request an object will resolve to a parent server (that may or may not provide popularity services). If the parent server does not provide popularity services, then the content will be obtained by the edge server from that parent server, and the content will be served to the client. On the other hand, if that parent server does provide popularity services, it can determine whether or not the edge server is a Longtail coserver based, e.g., on the IP (Internet Protocol) address of the edge server. For no-coservers, the parent server can handle the request without any popularity processing.

A request for content may be an initial request for an object or it may be a request for another part of an object, the initial part having already been served to the client. If the request is for the first part of the object (at 508), e.g., the request includes a request for the first byte of the resource (i.e., it is not a range request that starts after the beginning of the file), the popularity service 102 determines (as described below) if the object is currently popular. First, the popularity count for the current period is incremented (at 510). Based on its determination, the popularity service 102 returns one of three possible responses to the edge server 108 (S3b):

1. If the object has not reached a first I minimal level of popularity (at 512): the popularity service sends the edge server an instruction (e.g., HTTP 302) to redirect the client's request to the origin server (or to the CDN origin cache) (if origin redirects are enabled) (at 514).

2. If the object's popularity has exceeded the first/minimal level of popularity but has not yet exceeded a second, mid-tier threshold (at 516): the popularity service sends the edge server an instruction (e.g., HTTP 302) to redirect the client's request to a parent server (if mid-tier redirects are enabled) (at 518). Note that the redirect processing may further involve a determination of which particular parent server is responsible for storing the requested content. Such a determination would be based on how the distinct subsets of a content provider's library are partitioned across parent servers in the same intermediate tier. Further note that it is also possible for subsets of a content provider's library to be partitioned across servers residing in different intermediate tiers of a content delivery network.

3. If the object's popularity has exceeded the mid-tier threshold (i.e., the object is popular): The popularity service sends the edge server an instruction to serve the content itself (at 520). In a presently preferred implementation, the popularity service sends the edge server a redirect (HTTP 302) with a "follow me" flag set, to the origin server or, if there is one, to the parent tier.

If the edge server 108 receives a redirect from the popularity service 102 without the "follow me" flag set (cases 1 and 2 above), it simply forwards the redirect to the client 104 (S4*a*, 522, 524). If the edge server 108 receives a "follow me" redirect, it obtains and caches the resource (at 526) and serves it to the client (at 528).

If the popularity service 102 is unreachable, unresponsive, or returns a status code indicating an error (other than HTTP 404), the object is served out of the edge's cache server (and an alert condition is raised).

Once content has been cached at an edge server, the edge server will send notifications (e.g., in the form of revalidations) to the popularity service every time it gets another request for that content. E.g., with reference to the flowchart of FIG. 5, if the edge server 108 determines (at 502) that it has the requested content (or can obtain it from a peer), then, in addition to serving the content (at 504), it also instructs the popularity server to increment the object's popularity count for the current period (at 530). This process keeps the popularity servers up to date on the relative popularity of content being served in their region.

In presently preferred embodiments, the server selection mechanism 104 does not rendezvous clients to parent servers/caches. In other words, in these embodiments, client requests are always initially directed by the server selection mechanism to an edge server. In these cases, when a request for a resource arrives at a parent server/cache, that request should preferably be served (and filled if necessary) unconditionally (since any request from a client is assumed to be the result of a redirect served by an edge server).

In an embodiment where the server selector 104 can direct client requests directly to parent servers (or to any tier other than the edge tier), a server obtaining a client request may choose to redirect that request, e.g., based on popularity. However, those of skill in the art will know and understand, upon reading this description, that it is advisable to track the redirection of a request to avoid circular and/or infinite redirection. One way to avoid such a problem is to limit the number of levels of redirection (i.e., to limit the number of redirects to follow). In a presently preferred implementation, if no final server is selected after following, e.g., thirty two redirects, an error is issued. In some embodiments, if no final sever is selected after a predefined number of redirects, then the last server reached may be used to serve the content. One way to prevent looping is to use different server names (aliases) or IP addresses when redirecting requests so that a server receiving a request can tell whether or not it is a redirect. Those of skill in the art will know and understand, upon reading this description, that information can be transferred between servers using, e.g., HTTP headers or the like.

Those of skill in the art will know and understand, upon reading this description, that in a multi-tier CDN, the popularity service may be located at any tier, or there may be popularity services at more than one tier.

The middle (Parent) tier is optional.

Step (4*a*) may reply with content (if popular), or with a redirect to a parent or origin server (if not), in which the client will make another request (5*a* or 5*b*) to that tier to obtain the content.

If the request is an HTTP GET request or the like, it is forwarded to the popularity service. HTTP POST requests should always be forwarded directly to the origin, since that is where they will need to be processed, and the response to a POST request should not be cached. It may sometimes be preferable to direct GET requests to a different origin server than POST requests.

While the invention has been described with reference to the HTTP protocol, those of skill in the art will know and understand, upon reading this description, that different and/or other protocols may be used and are contemplated by the inventors. HTTP is described in various documents, e.g., Hypertext Transfer Protocol—HTTP/1.1, RFC 2616, Network Working Group, the entire contents of which are incorporated herein by reference.

Those of skill in the art will know and understand, upon reading this description, that different thresholds may be established for each tier in the CDN. Further, those of skill in the art will know and understand, upon reading this description, that each content item may have its own thresholds associated therewith. In this manner, the system can check all content for popularity, with the default thresholds being zero. In this manner, every request will automatically cause the popularity to exceed the threshold and will cause the content to be cached.

By positioning Popularity Servers regionally (paired with parent cache servers), popularity and cache tiers can be managed independently, on a regional basis. Content that is popular in one region/group may not be popular in another region/group (especially if each region/group corresponds to a geographic and/or political region).

We consider it desirable that rendezvous to popularity servers prioritize so-called "regional" proximity, so that clients within the same region will tend to cast their popularity "votes" within that region and get consistent treatment of popular resources. However, if there are multiple parent cache servers available, there will generally be no attempt to rendezvous particular clients to particular parents.

Defining & Measuring Popularity

In preferred embodiments, popularity of an object/resource is measured based on the number of times that object/resource is requested in various time periods. FIG. 6 is an exemplary data structure for maintaining the popularity data for a particular popularity server. The data structure 600 in FIG. 6 is a so-called tally hash structure.

In preferred embodiments, some or all edge servers are associated with (or bound to) popularity servers. An edge server that is bound to a popularity server is sometimes referred to as a bound Longtail coserver. Each popularity server in the system allocates a tally hash structure 800 per bound Longtail coserver. A configuration provides the number of resource (hash) slots to allocate. For a presently preferred implementation, the number of hash slots is on the order of 100 million slots per coserver. Each slot is divided into a number of time buckets, preferably 16 time buckets, each bucket being represented by, e.g., a 4-bit unsigned integer. Those of skill in the art will know and understand, upon reading this description, that the selection of the size of the value in each time bucket depends on policy decisions about bounds for the popularity thresholds, and for keeping very popular resources at the edge. The size, however, is heavily influenced by a need for compactness. One 8-byte word can store all time buckets for one resource slot, and therefore, 800 MB would be required per property, and five to eight such properties could be managed per popularity server without paging.

Each time bucket represents a time period, preferably a number of seconds.

The mapping of requests/content to slots is based on some function of the object name and perhaps other information associated with the request for the object. Preferably the mapping of objects to slots is based on a hash or message digest function (such as MAD or the like) over the object name (and preferably including some parts of the query string). Each slot may therefore represent one or more resources. Each time a query/request arrives at a popularity server for an object, the hash is computed and the slot in the table 800 (for the appropriate co-server) is determined, and the counts in that slot are used. In event of a hash collision, it is therefore possible that one bucket will be receiving and representing counts for more than one object. Since this result is generally undesirable (since it could result in cache fills and edge caching of unpopular objects), the number of buckets should be chosen to be as large as practical.

Those of skill in the art will know and understand, upon reading this description, that different and/or other data structures may be used to implement the popularity counting. For example, since in most cases the total number of resources is expected to far exceed the number of popular resources, a balanced b-tree may be preferable to a hash table. In addition, it is possible to reduce the size of the hash slot by using only some part of the hash. However, reducing the number of bytes of the hash used can result in more name collisions.

Although described above with respect to popularity, those of skill in the art will know and understand, upon reading this description, that other factors may be used along with (or instead of) popularity to determine whether or not to redirect requests. A rule base may be used to augment and/or override the popularity measures for certain resources. The rules in the rule base may be static or dynamic and may be set by the CDN administrator and/or the subscriber. For example, a subscriber may not want to pay for certain content to be served from the edge, regardless of its popularity, and may set a rule accordingly (this particular result could also be achieved by setting the thresholds for that particular content to prevent it from ever being cached at the edge).

Occasional log mining could be used to look for hash collisions in actual subscriber content libraries, and the hash function and bucket sizes could be tuned as needed.

At each time bucket boundary, the popularity service will logically "rotate" the buckets and zero out the oldest tally data for each object.

Whenever a coserver's enrollment in the popularity service changes (added or dropped, or perhaps hints changed), the data structures are to be updated.

The popularity of a given object may be determined as a weighted sum of its popularity over successive time periods. More recent time periods may be given higher weights.

In order to determine which content is to be managed by the popularity service, the CDN operator and/or the subscriber may specify:

The tiers at which the content will be managed—edge, intermediate (i.e., parent), or origin (subscriber's or storage tier). In order to be meaningful, at least one of intermediate and origin service should be enabled.

content that is to be managed based on its popularity, rather than simply always being served from a cache.

There are several reasons why a publisher/subscriber may not want the so-called "long-tail" content served from a caching CDN service, for example:

If cache fills are done from the subscriber's origin server and the subscriber pays for cache fill bandwidth, unnecessary fills for unpopular resources increase bandwidth costs without providing any value.

Serving an unpopular resource through a CDN cache adds latency (due to the cache fill), and risks forcing actually popular resources out of cache, potentially causing thrashing. The result is lower efficiency and the risk of degraded service.

For related or similar reasons, a CDN provider generally also does not want to serve long-tail content from an edge cache:

If cache fills are done from origin storage, unnecessary cache fills consume bandwidth both from the storage and cache systems, increasing (doubling) the internal cost to serve. This lowers efficiency, requiring relatively more bandwidth internally to serve the same content to the outside.

The second argument above also applies from the CDN's perspective: a CDN operator wants to minimize latency as well as the risk of thrashing in order to satisfy all of its subscribers.

Names, Addresses & Configuration Data

As is well known, each server in a network may be addressed by means of one or more network address (e.g., Internet Protocol or IP addresses). Each server in a network may also be known by one or more names (so-called hostnames—fully qualified domain names). Hostnames may be mapped to one or more IP addresses. A hostname may correspond to (and thus resolve to) more than one server.

A system such as ITM (described in the ITM patent applications mentioned above), allows a kind of hostname (called a supername) to refer to multiple servers, and resolves the supername to a nearby server.

Preferably the server selection mechanism is ITM, and each popularity server will have supername that resolves to reach nearby popularity server.

When a popularity server shares or is co-located with a parent server, the parent server may use the name by which it was addressed to determine whether to direct a request to the popularity service. That is, parent cache servers that provide popularity service may recognize requests that use one of the aliases reserved for popularity requests, and call into the popularity service to make the fill/no fill decision and return a redirect as described above.

As noted earlier, if the server selector mechanism does not send initial requests to non-edge servers, then all parent cache servers must recognize requests that have been redirected and serve the requested resource, filling it from the origin (or another tier), if necessary.

A servers hostnames are also referred to as its aliases. Each Longtail coserver preferably has at least two aliases (three if a parent cache/server tier is used): the published supername, the hostname used for popularity service requests, and (if used) the hostname used for parent cache redirects.

Popularity servers will preferably be reached via an ITM supername, and ITM will monitor for the service's availability across the set of servers. Popularity servers should be reached using real IP addresses, and not virtual IPs, and will not necessarily be redundant within a cluster. Redundancy can be provided by having multiple servers per supername. However, preferably there will be no attempt to synchronize the popularity tallies on popularity servers, with the expected desirable effect of managing popularity separately on a "regional" basis, the granularity being determined by the number and distribution of popularity servers deployed. Should a popularity server fail, this could cause a discontinuity in popularity responses as a new server becomes active for a given edge location, but this may be mitigated (for very popular resources) by periodic background refreshes.

Information about the resources and caching strategy include the following:
- the expected total number of resources associated with this coserver.
- the number of buckets used to store hit counts for each resource.
- the number of seconds that each bucket represents. Every time this interval goes by, the count in the oldest bucket is thrown out and a new bucket is started with a count of zero.
- when the sum of all buckets for a given resource reaches this number on any popularity server, the parent caches (if any) that use that server will start to cache the resource.
- when the sum of all buckets for a given resource reaches this number on any popularity server, the edge caches that use that server will start to cache the resource.
- the hash algorithm to apply to the resource names (optional). If not specified, a default algorithm (e.g. MD5) will be used.
- the maximum number of this coserver's resources that should be in cache at an edge at any given time. This value may be ignored in certain embodiments.
- the maximum number of this coserver's resources that should be in cache at a parent at any given time. This value may be ignored in certain embodiments.

Preferably resources should not be pre-expired on parent cache servers, as that will cause unnecessary requests to the origin server or queries to peer caches.

Those of skill in the art will know and understand, upon reading this description, that a decision to serve at a given tier that is based only on popularity counts, will not take into account capacity to serve at that tier—so this scheme could overload an origin server or parent tier if they do not have sufficient capacity. Further, if popularity is measured in terms of absolute thresholds on numbers of requests, and if the library is sufficiently large, this could cause cache thrashing at the parent or edge tiers.

Authentication with the origin cache or server, if needed, should be done by the server that receives the initial request from the client. During processing of a redirected request.

Various documents, including patents and patent applications, have been incorporated by reference into this application. In case of any conflict between an incorporated document and the present application, the present application, including any definitions herein, will control.

Thus is provided a feature that allows a CDN to be responsive to increasing or decreasing "popularity" of content by shaping where in the CDN content is positioned and served from.

Figure 7:
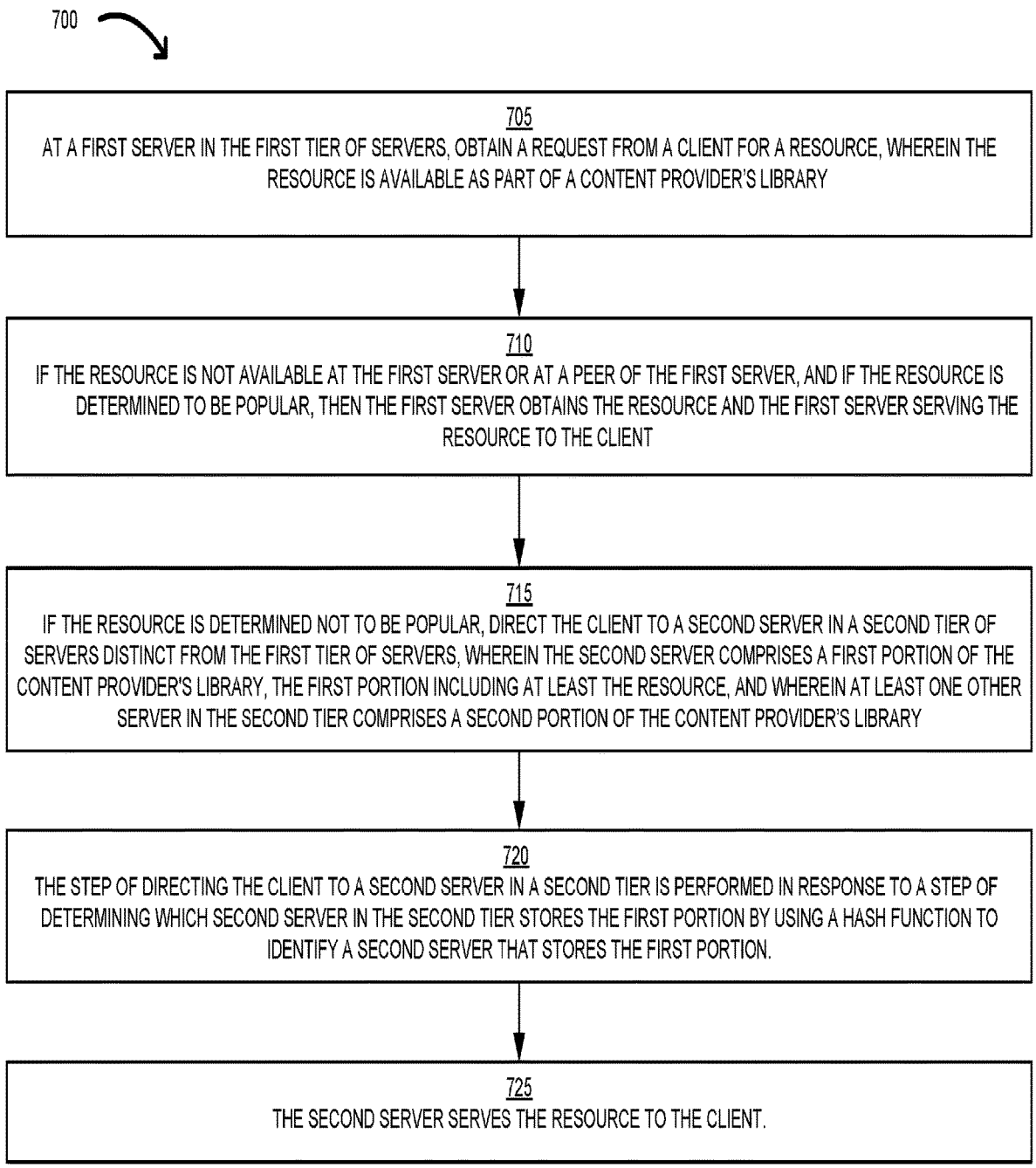
FIG. 7 is a flowchart showing processing steps of a multi-tiered content delivery network.

FIG. 7 is a flowchart 700 of processing steps associated with a multi-tiered content delivery network.

In step 705, a first server in a first tier of servers obtains a request from a client for a resource. In one embodiment, the resource is available as part of a content provider's library (e.g., the resource may be a digital movie requested from an on-line streaming movie provider).

In step 710, if the resource is not available at the first server or at a peer of the first server, and additionally if it is determined that the resource is popular (using processing and functionality previously described), then the first server obtains the resource and serves it to the client. For example, the first server may obtain the resource from an origin server and/or a parent server (in any intermediate tier between the first server and the origin server).

In step 715, if the resource is determined not to be popular (again, using processing and functionality previously described), the client is directed to a second server in a second tier of servers (e.g., any intermediate tier) distinct from the first tier of servers. In this example embodiment, the second server comprises a first portion (or subset) of the content provider's library. For the purposes of this example, the first portion comprises at least the resource that was requested by the client. Furthermore, the second tier includes at least one other server that comprises a second portion of the content provider's library. According to one example embodiment, the first portion is distinct from the second portion (i.e., the portions/subsets of the library do not overlap, or overlap only minimally).

In another example embodiment, the portions of the content provider's library are logically partitioned across servers in the second tier. For example, the portions/subsets of a content provider's library can be partitioned alphabetically across servers in the second tier based on a naming convention associated with each distinct resource in the content provider's library (e.g., digital movies having titles beginning with A-F are stored on server A in a second/intermediate tier, digital movies having titles beginning with G-R are stored on server B in the second/intermediate tier, and digital movies having titles beginning with S-Z are stored on server C in the second/intermediate tier).

Assume, for example, that a content provider's library comprises multiple content-types (e.g., movies, video games, music, software patches, etc.). Per one example embodiment, it would be advantageous to store a proportionate amount of each content type on each participating intermediate tier server (e.g., 60% movies, 30% video games, 10% software downloads on each participating server in the tier). In such a scenario, if the demand for a particular content-type increases during a given time period (and/or demand for a different content-type declines), then such fluctuations in demand will generally affect each participating server proportionately.

Noted that resources may be partitioned across multiple servers by naming convention (e.g., alphabetically) as well as having proportionally distributed content per server (e.g., by content-type). With this in mind, it should be further noted that logical partitioning of resources/content among intermediate servers is not limited to just alphabetic naming convention segmentation and/or content-type proportionality. It is contemplated that the partitioning may be based on various metrics such as, but not limited to, numeric hash values (e.g., MD5) associated with content/resource URLs, the size or file type of a resource, other identifiers associated with other various naming conventions (e.g., numerical, alphanumerical, proprietary, encrypted/mangled, etc.), the relative size and traffic behavior of various resources in a content provider's library or the content provider's library as a whole, and the like.

In step 720, the step of directing the client to a second server in the second tier is performed in response to a determination of which second server actually stores the first portion. In one example, the server that stores the first portion (or, for that matter, any portion that comprises the requested resource) is identified using a hash function (similar to the processing and functionality previously described).

In step 725, the second server that stores the first portion serves the resource to the client.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

We claim:

1. A method of content delivery in a content delivery network comprising:
    receiving, at a first server of a first tier of servers of the content delivery network, a request from a requesting device for a resource available from the content delivery network;
    accessing a popularity service associated with the content delivery network to determine a popularity designation associated with the requested resource;
    requesting the resource from a second server of the content delivery network;
    processing, at the first server of the first tier of servers, a redirect instruction from the second server of the content delivery network to obtain the resource from a content server of the content delivery network;
    receiving an instruction to not cache the portion of the resource at the first server of the first tier of servers when the portion of the resource is obtained from the content server of the content delivery network; and
    providing the obtained resource to the requesting device.

2. The method as recited in claim 1 wherein the popularity designation associated with the requested resource indicates that the requested resource is not popular.

3. The method as recited in claim 1 wherein the popularity designation associated with the requested resource indicates that the requested resource is popular, the method further comprising: receiving an instruction to cache the resource at the first server of the first tier of servers when the resource is obtained from the content server of the content delivery network.

4. The method as recited in claim 1 wherein the second server is a metro mid-tier server of the content delivery network.

5. The method as recited in claim 1 wherein the second server is a peer server of the first tier of servers of the content delivery network.

6. The method as recited in claim 1 wherein the popularity designation associated with the requested resource comprises an indication whether a current popularity value for the resource exceeds a first predetermined popularity threshold.

7. The method as recited in claim 6 wherein the popularity service is associated with the second server of the content delivery network.

8. The method as recited in claim 6 wherein the popularity service is associated with the first server of the first tier of servers of the content delivery network.

9. The method as recited in claim 1 wherein the content delivery network further comprises a second tier of servers distinct from the first tier of servers, and wherein the second server is in the second tier of servers.

10. The method as recited in claim 3 further comprising:
    receiving, at the first server of the first tier of servers of the content delivery network, an additional request for the resource available from the content delivery network;
    determining that the resource is cached at the first server of the first tier of servers; and
    providing the cached resource from the first server of the first tier of servers in response to the additional request for the resource.

11. A content delivery network comprising:
    a first tier of servers comprising a first plurality of servers, an edge server of the first tier of servers receiving a request from a requesting device in communication with the first server for a resource available from the content delivery network;
    a second tier of servers comprising a second plurality of servers, a first server of the second plurality of servers receiving a request from the edge server for the content and, in response, transmitting a redirect instruction intended for the requesting device to the edge server to obtain the resource from a content server and transmitting an instruction to not cache the portion of the resource at the edge server when the portion of the resource is obtained from the content server; and
    a popularity service tracking a popularity designation associated with the requested resource;
    wherein the edge server processes the redirect instruction to obtain the content from the content server and provides the obtained content to the requesting device.

12. The content delivery network as recited in claim 11 wherein the popularity designation associated with the requested resource indicates that the requested resource is not popular.

13. The content delivery network as recited in claim 11 wherein the popularity designation associated with the requested resource indicates that the requested resource is popular and the first server of the second plurality of servers transmits an instruction to cache the resource at the content server of the first tier of servers when the resource is obtained from the content server.

14. The content delivery network as recited in claim 11 wherein the first server of the second plurality of servers is a metro mid-tier server of the content delivery network.

15. The content delivery network as recited in claim 11 wherein the first server of the second plurality of servers is a peer server of the first tier of servers of the content delivery network.

16. The content delivery network as recited in claim 11 wherein the popularity designation associated with the requested resource comprises an indication whether a current popularity value for the resource exceeds a first predetermined popularity threshold.

17. The content delivery network as recited in claim 16 wherein the popularity service is associated with the first server of the second plurality of servers of the content delivery network.

18. The content delivery network as recited in claim 16 wherein the popularity service is associated with the content server of the first tier of servers of the content delivery network.

19. A method of content delivery in a content delivery network comprising:
  receiving, at a first server of a first tier of servers of the content delivery network, a request from a requesting device for a resource available from the content delivery network;
  accessing a popularity service associated with the first server of the first tier of the content delivery network to determine a popularity designation associated with the requested resource;
  receiving an instruction to not cache the resource at the first server of the first tier of servers when the portion of the resource is obtained from the content server of the content delivery network;
  requesting the resource from a second server of the content delivery network based at least on the popularity designation associated with the requested resource; and
  providing the obtained resource to the requesting device.

20. The method as recited in claim 19 wherein the second server of the content delivery network is a content server storing the requested content.

* * * * *